US009041694B2

(12) United States Patent
Nurmi et al.

(10) Patent No.: US 9,041,694 B2
(45) Date of Patent: May 26, 2015

(54) OVERDRIVING WITH MEMORY-IN-PIXEL

(75) Inventors: Juha H-P Nurmi, Salo (FI); Jani E. Penttila, Lempaala (FI)

(73) Assignee: Nokia Corporation, Espoo (FI)

( * ) Notice: Subject to any disclaimer, the term of this patent is extended or adjusted under 35 U.S.C. 154(b) by 297 days.

(21) Appl. No.: 12/931,002

(22) Filed: Jan. 21, 2011

(65) Prior Publication Data

US 2012/0188166 A1 Jul. 26, 2012

(51) Int. Cl.
*G06F 3/038* (2013.01)
*G09G 3/36* (2006.01)

(52) U.S. Cl.
CPC ...... *G09G 3/3648* (2013.01); *G09G 2300/0814* (2013.01); *G09G 2300/0857* (2013.01); *G09G 2310/0205* (2013.01); *G09G 2310/0251* (2013.01); *G09G 2320/0252* (2013.01); *G09G 2320/0261* (2013.01)

(58) Field of Classification Search
CPC .............. G09G 2300/0814; G09G 2300/0857; G09G 2310/0205; G09G 2310/0251; G09G 2320/0252; G09G 2320/0261; G09G 3/3648
USPC ........................................... 345/204, 690, 89
See application file for complete search history.

(56) References Cited

U.S. PATENT DOCUMENTS 5,563,822 A * 10/1996 Yiu et al. ................. 365/185.14
5,821,909 A * 10/1998 Yiu et al. ................. 365/185.14
5,909,206 A * 6/1999 Yokota et al. .................... 345/98
5,945,972 A * 8/1999 Okumura et al. ............... 345/98
5,956,273 A * 9/1999 Lin et al. .................. 365/185.19
6,114,778 A * 9/2000 Rostron et al. ................ 307/116
6,206,977 B1 * 3/2001 Nurmi et al. ..................... 127/15
6,441,829 B1 * 8/2002 Blalock et al. ................ 345/690
6,943,766 B2 * 9/2005 Nakamura et al. .............. 345/98
6,965,366 B2 * 11/2005 Ozawa ............................ 345/89
7,053,876 B2 * 5/2006 Kimura et al. .................. 345/98
7,511,645 B1 * 3/2009 Ranucci ......................... 341/120
7,675,491 B2 * 3/2010 Ogura ............................. 345/76
8,059,142 B2 * 11/2011 Handschy et al. ............ 345/690
8,111,271 B2 * 2/2012 Hudson et al. ................ 345/691
8,368,709 B2 * 2/2013 Nurmi ........................... 345/545
2003/0098860 A1 * 5/2003 Nakamura et al. ............ 345/211
2003/0142056 A1 * 7/2003 Okamoto ........................ 345/90
2005/0190133 A1 * 9/2005 Kawachi ......................... 345/87
2006/0181497 A1 * 8/2006 Edo et al. ........................ 345/92
(Continued)

FOREIGN PATENT DOCUMENTS

EP 0 617 398 A1 9/1994
JP 2000155558 A * 6/2000 ............... G09G 3/36

*Primary Examiner* — Quan-Zhen Wang
*Assistant Examiner* — Chun-Nan Lin
(74) *Attorney, Agent, or Firm* — Harrington & Smith

(57) ABSTRACT

Within one gate selection time interval: first pixel information is driven from a source line to a liquid crystal LC element of a pixel; and second pixel information is driven from the source line to a memory element of the pixel; and the second pixel information is driven from the memory element of the pixel to the LC element of the pixel. Respecting a second pixel, similar occurs for third and fourth pixel information within a second gate selection time interval, such that the second pixel information is driven from the memory element of the first pixel to the LC element of the first pixel simultaneous with the third pixel information being driven from the source line to the LC element of the second pixel. Such simultaneous driving enables a faster refresh rate and/or larger displays. Various circuit-specific implementations are shown.

21 Claims, 18 Drawing Sheets

(56) References Cited

U.S. PATENT DOCUMENTS

| | | | | |
|---|---|---|---|---|
| 2007/0040785 | A1* | 2/2007 | Edwards et al. | 345/92 |
| 2007/0247478 | A1* | 10/2007 | Hagino et al. | 345/698 |
| 2008/0088552 | A1* | 4/2008 | Toya | 345/84 |
| 2008/0158117 | A1* | 7/2008 | Wong et al. | 345/87 |
| 2008/0238953 | A1* | 10/2008 | Ogura | 345/697 |
| 2009/0225096 | A1* | 9/2009 | Yoshiga et al. | 345/545 |
| 2009/0237343 | A1* | 9/2009 | Shibazaki et al. | 345/92 |
| 2009/0273388 | A1* | 11/2009 | Yamashita | 327/416 |
| 2009/0284500 | A1* | 11/2009 | Yamashita | 345/204 |
| 2010/0085286 | A1* | 4/2010 | Yamashita et al. | 345/82 |
| 2010/0177083 | A1* | 7/2010 | Yamashita | 345/211 |
| 2011/0069075 | A1* | 3/2011 | Nurmi | 345/545 |
| 2011/0084950 | A1* | 4/2011 | Keitaro et al. | 345/211 |
| 2011/0273493 | A1* | 11/2011 | Yoshiga et al. | 345/694 |
| 2011/0298784 | A1* | 12/2011 | Yamashita | 345/213 |
| 2012/0038604 | A1* | 2/2012 | Liu et al. | 345/211 |
| 2012/0127140 | A1* | 5/2012 | Ryan et al. | 345/207 |
| 2012/0162594 | A1* | 6/2012 | Tamaki et al. | 349/139 |

* cited by examiner

OVERDRIVING WITH MEMORY-IN-PIXEL

TECHNICAL FIELD

The exemplary and non-limiting embodiments of this invention relate generally to display systems for electronic displays, and particularly for methods, devices and computer programs for overdriving/underdriving pixels of a memory-in-pixel (MIP) display.

BACKGROUND

Digital display screens are in common use in a wide variety of products, from flat screen televisions and laptop/computer displays to portable personal devices (e.g., mobile phones and music appliances) and from kitchen appliances to automobiles. There are of course other implementations in commercial products which are not for the general retail consumer such as military hardware for which these teachings are equally adaptable. Such display screens are formed of a grid of pixels, each of which changes color and/or greyscale shading by driving a voltage to a certain liquid crystal LC element which is the pixel seen by the human eye. Every pixel of the grid is refreshed at a rate faster than the human eye can detect, typically 60 Hz, to assure the human viewer sees fluid rather than staggered motion of the objects being displayed.

Static displays are not overly demanding on such liquid crystal displays LCDs and the software/hardware processes that control the LCD, but video tends to push the limits of displaying fluid motion, particularly for high resolution LCDs and/or large-screen LCDs. One reason is that conventionally there is one pixel of the grid updated at a time, and so increasing resolution by adding more lines/columns of pixels begins to run up against the 60 Hz screen refresh rate which many manufacturers consider the minimum allowable for good quality video perception. Each pixel must be given some minimum time to change to its new color/shade before the controlling software/hardware moves to update the next pixel of the grid, but the refresh rate for the grid as a whole cannot fall below the 60 Hz limit. This minimum time is termed a gate selection time, since the control line which opens and closes a switch (transistor) for adjusting voltage to a given pixel is termed the pixel's gate (see FIG. 1). For this reason it is sometimes difficult to provide LCDs with the increased resolution (and/or larger screen size) which users often prefer while still retaining the capacity to provide smoothly fluid video which many users have come to take for granted in smaller and less pixellated LCD grids.

One way to avoid the 60 Hz limit is to add a memory element to each pixel; this is termed a memory-in-pixel (MIP) display panel, and a simple circuit diagram of an MIP pixel cell 100 is presented at FIG. 1. MIP enables the refresh rate to be dropped significantly, by example to 10 Hz. This is practical because pixel updating is different with MIP than with 'normal' non-MIP processing. Traditionally, MIP technology was developed to reduce power consumption; each pixel having its own memory enables the per-pixel refreshing to be done less often. While refreshing pixels at 10 Hz could cause flicker in the visual display, the flicker potential is offset because pixel luminance does not vary too much when MIP is used. Additionally the MIP display mode for power saving is often designed to use ambient light reflected from the display pixel and flicker is less noticeable in low light. Since sometimes an MIP LCD can operate with or without the MIPs being utilized, many MIP displays can operate in two different modes: normal (non-MIP) mode and MIP mode. In the normal mode the pixel information is refreshed from a display driver integrated circuit IC, and this pixel information always includes full color information. For the 16 million color palette often employed for personal computer and smartphone display screens this means updating 24 bits per pixel. In the MIP mode the pixel information is refreshed from the memory which is on the pixel itself (the MIP) and so the update information can be reduced, by example to 8 colors or 3 bits at low refresh rate to save power.

At FIG. 1 the data source line 101 carries the voltage which gives the pixel its color/shade, and the gate line 102 controls a switch (transistor) 103 whether the data source line 101 is connected or not. The transistor 103 controlled by the gate line 102 is closed during the gate selection time for the FIG. 1 pixel cell 100 and open at all other times (when other pixel cells are being updated) until the refresh rate has cycled through and this pixel cell is again updated. While the gate transistor 103 is closed the liquid crystal element LC 104 is refreshed directly from the data source line 101. The data source line 101 and gate line 102 are conventionally present in both MIP and non-MIP displays. For MIP displays there are additional control lines 106 for operating a memory element 105 (such as for example a 1-bit static random access memory SRAM). The MIP control line 106 controls a switch 107 which when closed allows the data stored in the MIP 105 to refresh the LC 104. The data source line 101, gate line 102 and MIP control line 106 also control other pixel cells and so the various signals/voltages on them are synchronized to select a specific pixel cell at any given time. While FIG. 1 is a simplified circuit and different manufacturers may implement a MIP pixel differently, there is always a source or data line and a gate line controlling whether the source/data line is connected to the pixel being updated, and some control for selecting whether the LC is refreshing from the source line (normal mode) or from the on-cell memory (MIP mode).

FIGS. 2-3 provide a broad overview of how pixel updating works in the different modes. FIG. 2 represents the normal mode in which the MIP functionality is turned off. The information on the source line 101, termed the image information, is updated from a memory 201 of the display driver IC 202 on the display panel 203, and the MIP is not used at all. As in the above example, this is a 24 bit update. At FIG. 3 the MIP functionality is turned on; at step 1 the image information is loaded from the memory 301 of the display driver IC 302 onto the MIP of the display 303 once and then stopped before the next refreshed image frame, and at step 2 the image information is refreshed in the MIP. Timing for this two-step update is done on the display driver IC.

FIG. 4 illustrates what is termed an overshoot/undershoot method for improving the smoothness of moving images displayed on an LCD. The improvement arises by improving the liquid crystal material response time by purposely overshooting the desired voltage (if voltage is increased) or similarly undershooting the desired voltage (if voltage is decreased) to the pixel being updated. There are two phases: first, overshoot (to Vmax at the left side of FIG. 4) or undershoot (to below V0 at the right side of FIG. 4) with a source value, which depends on the previous and the next pixel voltage values and on a constant gate selection time. Next, assert the final value (V0) within the constant gate selection time, where the final value is the desired pixel source value.

As noted above, the gate selection time cannot be changed: too long and the LCD refresh rate is no longer smooth to the human eye, and too short and not all pixels can be updated within one refresh cycle of the given refresh rate. So gate times of phases 1 and 2 also cannot be reduced, because these times depend on the liquid crystal material of the pixel itself. Active source voltage level driving is needed for a minimum time which is dictated by the LC material itself, and this limits the number of lines on the display panel. The next gate cannot yet be selected or else the pixel which that next gate controls will be driven by a voltage for the current gate.

The overdrive/underdrive approach depicted by FIG. 4 is sometimes referred to as a direct driving method. It limits the number of the scanned gate lines what can be implemented on a display panel as follows. Assume each pixel needs 50 μs for driving; this means that only one of the gate lines can be selected during 50 μs when the rest of the gate lines cannot be selected (49 μs to overdrive/underdrive and 1 μs to final drive). The desired refresh rate is 60 Hz (16.6 ms) on the display panel. This means that the maximum number gate lines that can be implemented and driven on the display panel, is 332 lines (=16.6 ms/50 μs). As above, the 50 μs arises from the response time of the LC pixel material itself, so reducing that gate selection time would reduce sharpness of the displayed video by effectively preventing the pixel from achieving its final color.

What is needed in the art is a way to refresh pixels such that an LCD with a very high pixel count can be refreshed fast enough to display to the human eye smooth motion of objects in video while maintaining a wide array of colors for sharpness. Such very high pixel counts may arise from a large screen size and/or high resolution, each of which has additional (vertical and/or horizontal) lines of pixels.

SUMMARY

The foregoing and other problems are overcome, and other advantages are realized, by the use of the exemplary embodiments of this invention.

In a first aspect thereof the exemplary embodiments of this invention provide a method, comprising, within one gate selection time interval: driving first pixel information from a source line to a liquid crystal element of a pixel; driving second pixel information from the source line to a memory element of the pixel; and driving the second pixel information from the memory element of the pixel to the liquid crystal element of the pixel.

In a second aspect thereof the exemplary embodiments of this invention provide an apparatus comprising at least one processor and at least one memory storing computer program code. In this aspect the at least one memory and the computer program code are configured with the at least one processor at least to, within one gate selection time interval: drive first pixel information from a source line to a liquid crystal element of a pixel; drive second pixel information from the source line to a memory element of the pixel; and drive the second pixel information from the memory element of the pixel to the liquid crystal element of the pixel.

In a third aspect thereof the exemplary embodiments of this invention provide a tangible memory storing a program of computer readable instructions comprising: code for driving first pixel information from a source line to a liquid crystal element of a pixel within a gate selection time interval; code for driving second pixel information from the source line to a memory element of the pixel within the gate selection time interval; and code for driving the second pixel information from the memory element of the pixel to the liquid crystal element of the pixel within the gate selection time interval.

DETAILED DESCRIPTION

Figure 4:
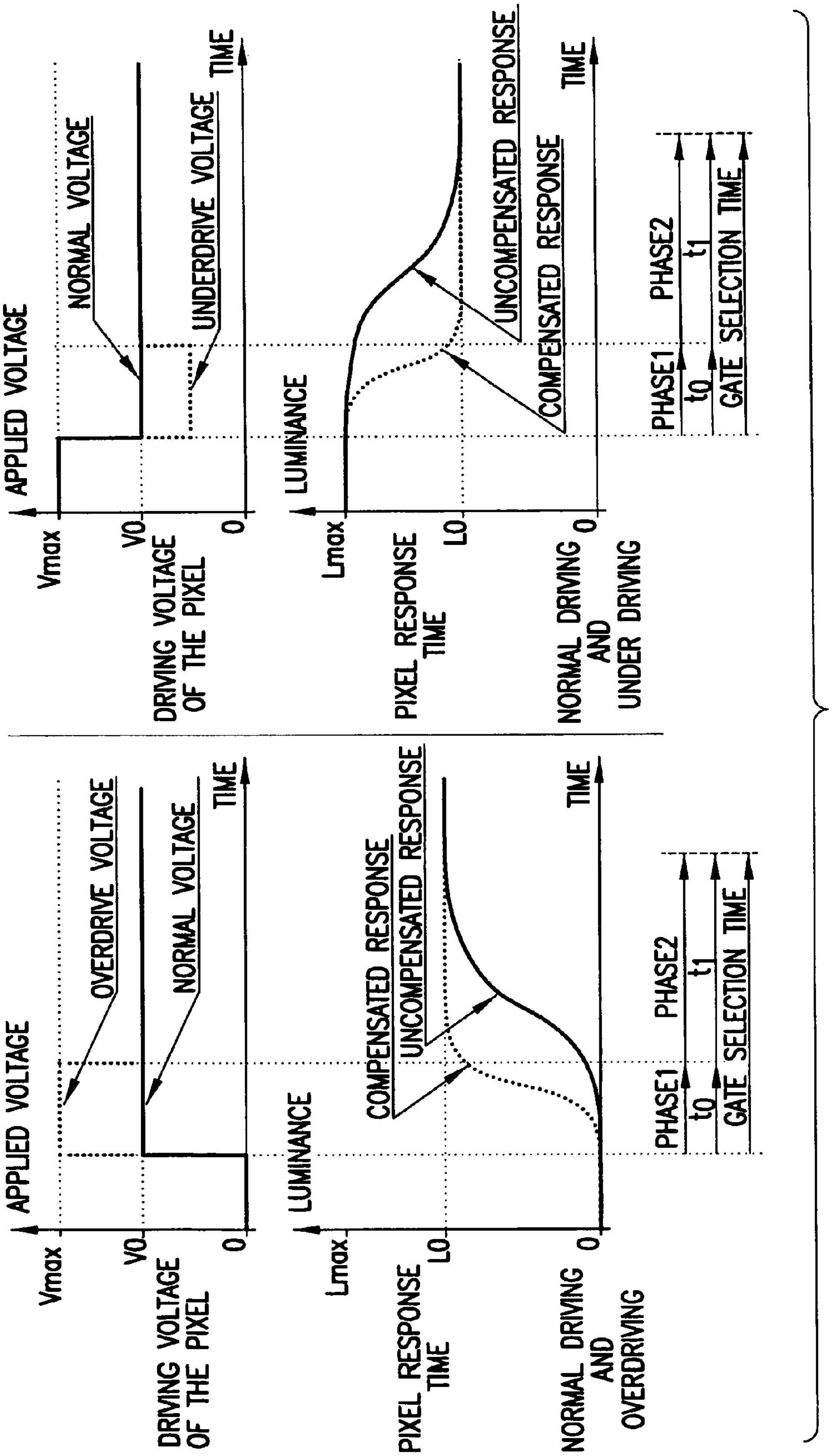
FIG. 4 illustrate voltage and luminance plots for direct driving a pixel and separately illustrate overvoltage and undervoltage driving.

If the illustrations at FIG. 4 are considered a direct driving method, one might consider the exemplary embodiments of the invention detailed below as an indirect driving method. According to these exemplary embodiments the gate lines may be driven in various different modes (different voltage levels), such as off, overdriving (underdriving) load, final load, and final load driving. An important aspect of the indirect driving method is that the gate lines can be in different modes simultaneously, and so the pixel updating need not be series sequential across the LCD grid but different pixels may be updated within the same gate selection time. By example, one gate line may be in the "overdriving load mode (inputting from the source line) while another gate line is in the "final load driving" mode or the off mode (the source line is not used).

The import of this simultaneous driving of different pixels means that the gate selection time is independent of the pixel load time. The pixel load time is a function of the LC material itself, and in the background description the gate selection time was made as short as possible, but could not be shorter than the pixel load time of pixel color would suffer since the pixel would end its updating before it achieved the desired color/shade. De-coupling the gate selection time from the pixel load time means that a higher number of gate lines can be implemented on the display panel, and still meet the refresh rate sufficient that the human eye will see smoothly moving video on the display. The indirect driving method detailed by example below removes the resolution dependency of prior art LCD solutions.

For the description below, consider that one source line/grid line intersection of the LCD grid is one pixel, which includes the following:

- an additional memory for storing information of the final load value (the MIP); and
- logic, including
  - what is controlled by the gate line;
  - the driven switches (transistors) which control pixel driving for
    - overdriving (underdriving) load mode;
    - final load mode (source line to MIP); and
    - final load driving mode (MIP to pixel).

Figure 1:
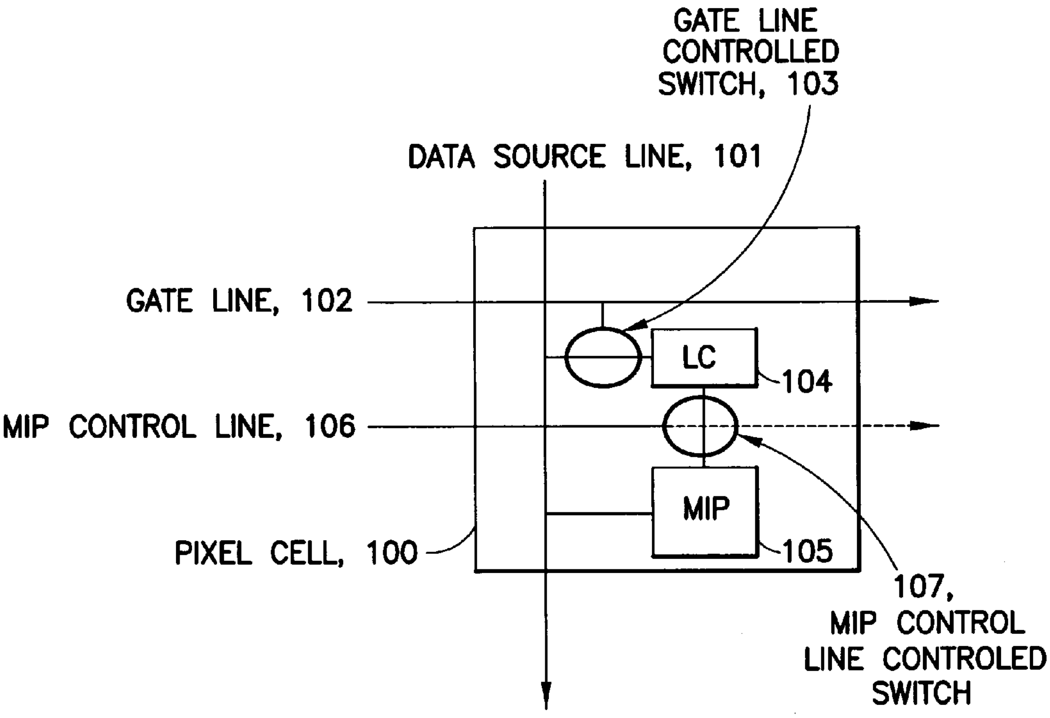
FIG.1 PRIOR ART
FIG. 1 illustrates an exemplary circuit for implementing a memory-in-pixel (MIP) display.
Figure 2:
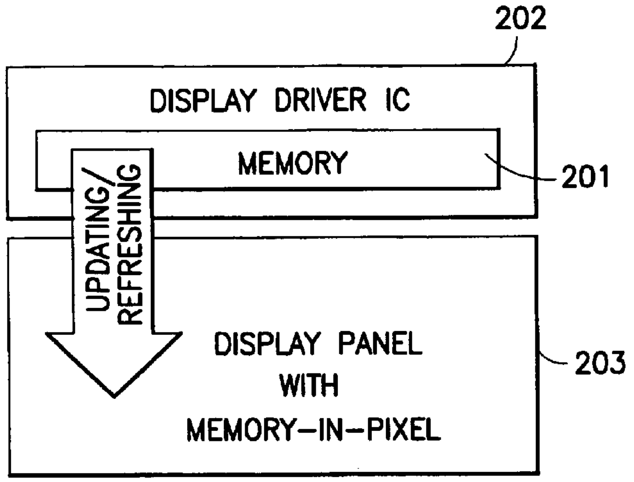
FIG.2 PRIOR ART
FIGS. 2-3 illustrate how a pixel is updated in normal (non-MIP) mode and in MIP mode, respectively.
Figure 3:
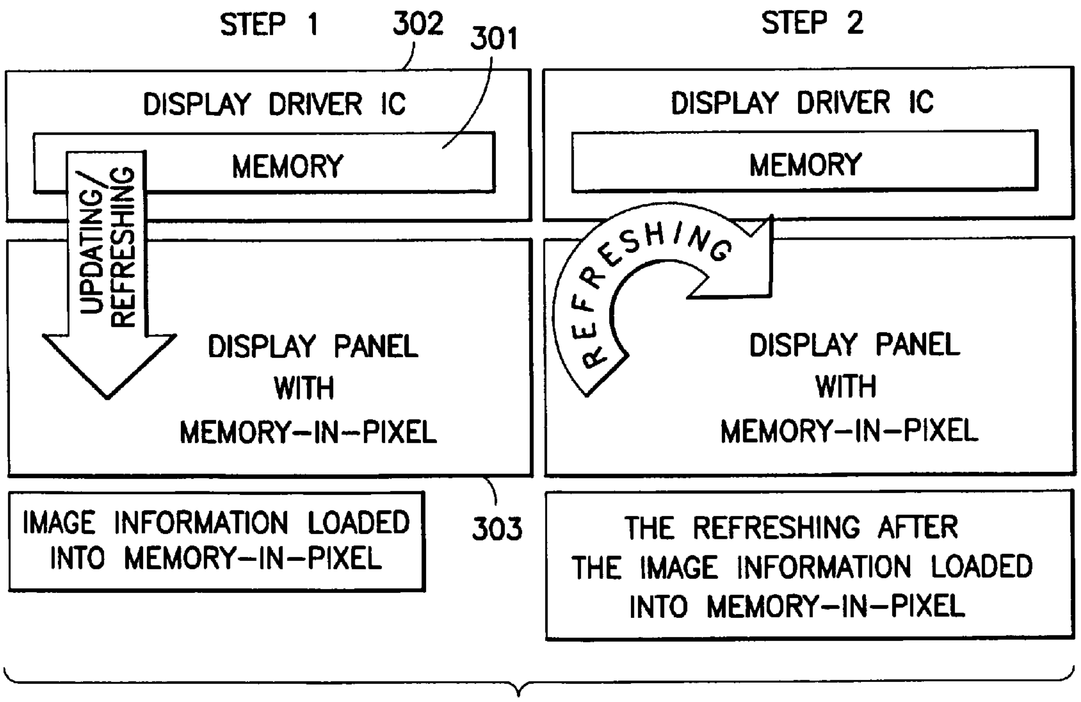
FIG.3 PRIOR ART
Figure 5:
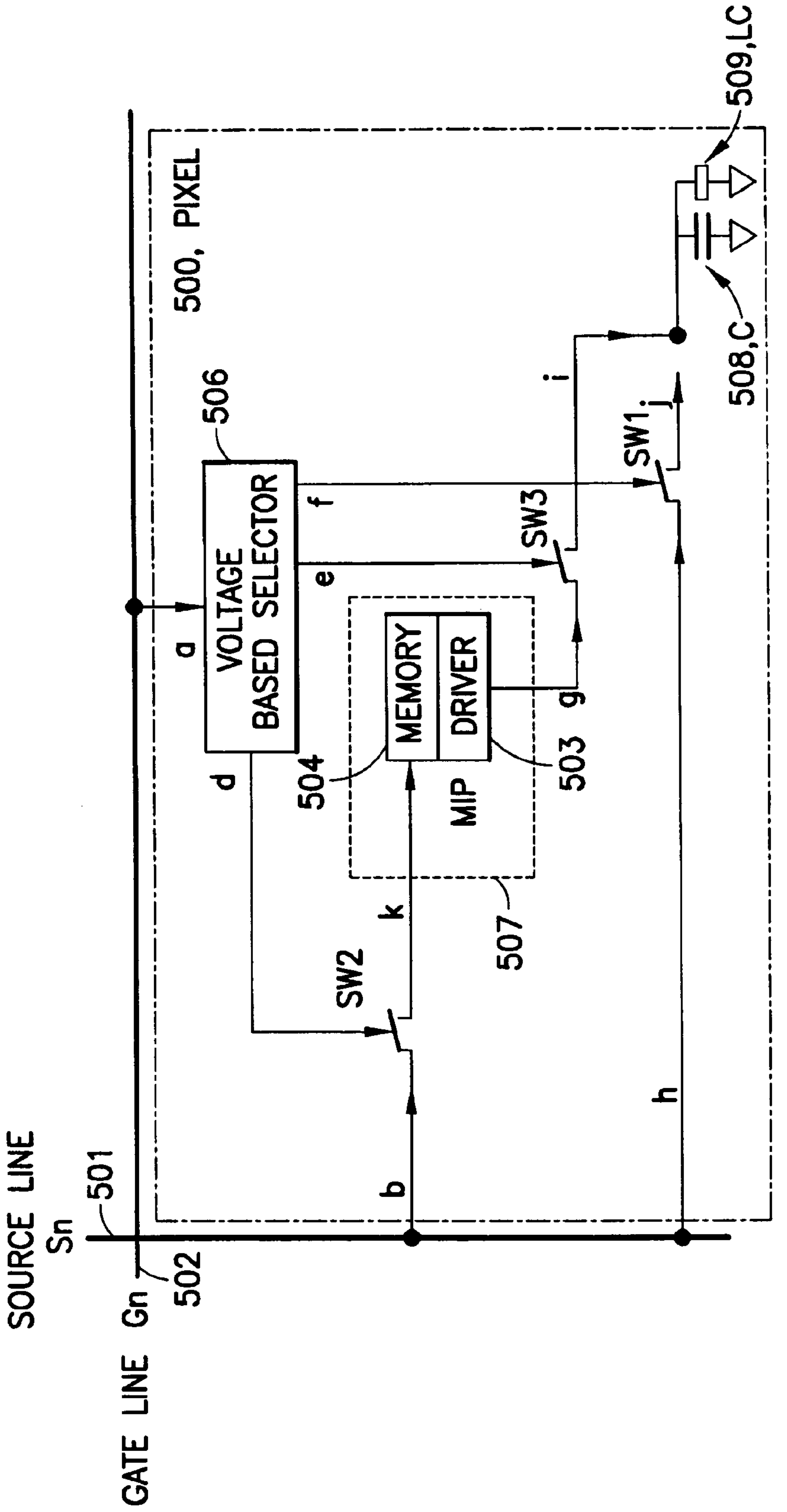
FIG. 5 is a circuit diagram of a pixel of a liquid crystal display according to an exemplary embodiment of the invention.

For brevity the following description uses the term overdriving, but underdriving is also included since respecting the final load it operates mirror to overdriving, as FIG. 4 illustrates. FIG. 5 is a circuit diagram illustrating one exemplary implementation of a pixel operable for the indirect drive method. The pixel 500 is provided pixel information (voltage levels) via a source line 501 whose access is switched open and closed via a gate line 502. The pixel 500 includes a driver 503 and pixel memory element 504 which like FIG. 1 make up the MIP 507 component; and the pixel 500 also has a voltage based selector 506 which is configured with various switches (transistors) to selectively controls whether the liquid crystal LC element 509 is loaded from the source line Sn 501 (via switch SW1) or the MIP 507 (via switch SW3). Notably, this selective loading is based on voltage on the gate line Gn 502. There is a further second switch SW2, also controlled by the voltage based selector 506, for loading the MIP 507 with pixel information from the source line Sn 501, and there is a pixel storage capacitor C 508 in parallel with the LC element 509. Various circuit lines are designated by letters at FIG. 5 for clarity of description.

The inventors are not aware of any other variable gate-line voltage for implementing an LCD pixel. Another implementation for pixel circuitry to achieve the same result as detailed below with reference to FIG. 5 is to drive the three switches SW1, SW2 and SW3 open or closed based on a high/low signal on is multiple gate lines per pixel, one per each switch. In this alternate embodiment signaling on the multiple gate lines per pixel are synchronized to achieve the switch positioning detailed below for the FIG. 5 implementation utilizing a voltage based selector 506 and variable gate line voltage.

In an embodiment the voltage based selector 506 includes comparators for detecting the different voltage levels, and logic for selecting which switch(es) to throw (transistors to apply gate voltage). The various switches may be implemented as transistors having gate-source voltages $V_{gs}$ for the open and closed states.

The pixel circuit of FIG. 5 operates as follows with reference to FIGS. 6A-C. The text description assumes active control signals are asserted to open and to close each of the switches, but in an exemplary embodiment the switches are default open and only closed upon an active control signal to do so (the reverse choice for default switch position is also an option). The gate line Gn 502 is driven to the "Off" mode (e.g. 0V) when the voltage based selector 506 is inputting this mode via circuit line 'a' and outputting control signals via circuit lines 'd', 'e' and 'f' to keep switches SW1, SW2 and SW3 open. The source line (Sn) is driven with first pixel information, which is the needed overdriving or underdrive voltage. The gate line Gn 502 is then driven from the off mode to the overdrive load mode (e.g. 5V), and this mode change is input to the voltage based selector 506 via circuit line 'a'. The voltage based selector 506 implements this mode change by outputting control signals via circuit lines 'd', 'e' and 'f' to keep switches SW2 and SW3 open and switch SW1 closed. Therefore the overdrive or underdrive voltage, what lies on the source line Sn 501, is driven via circuit lines 'h' and 'j' to the pixel storage capacitor C 508 from which follows the change to the color/shading of the LC element 509 which the viewer sees.

Figure 6A:
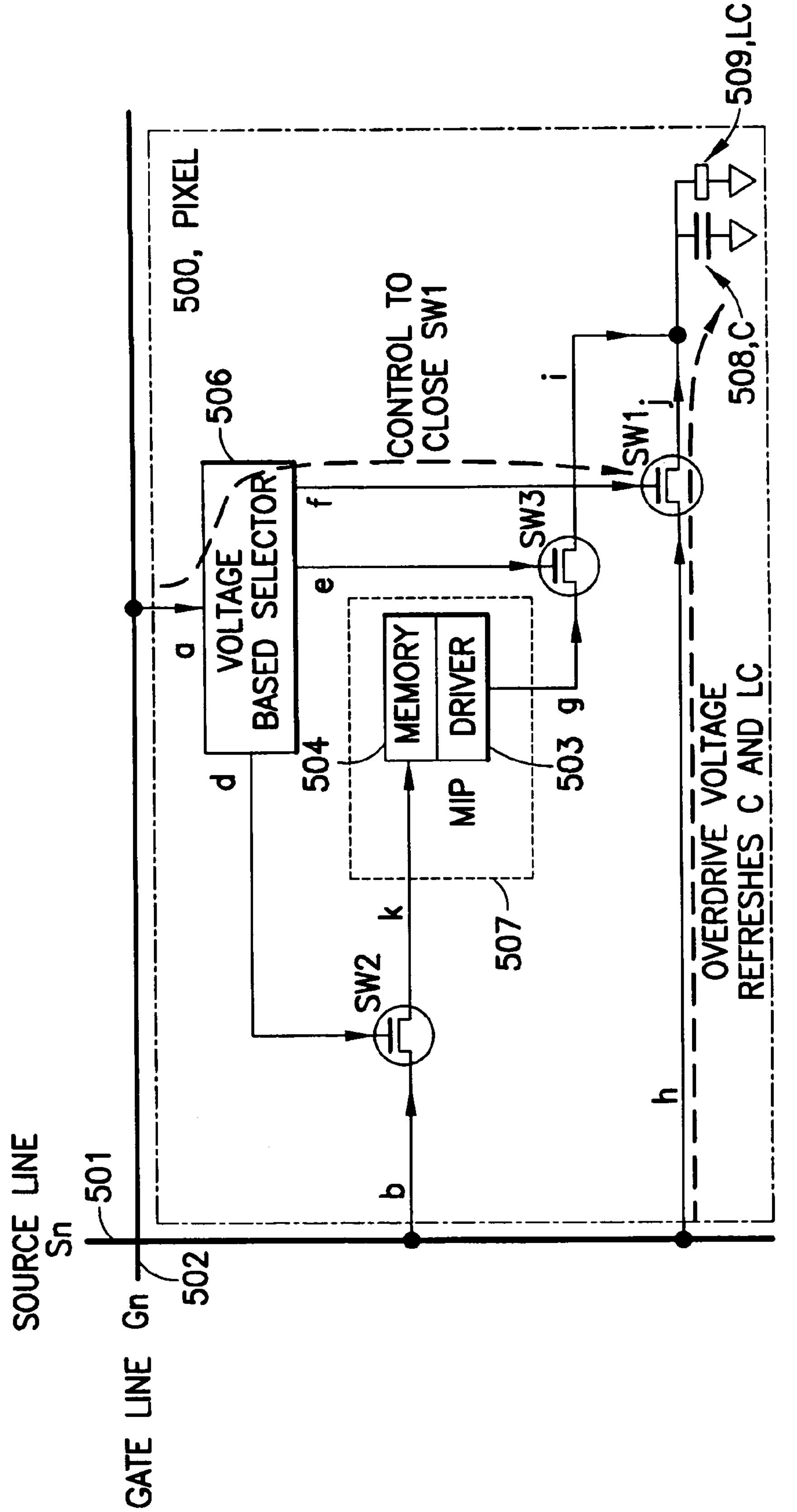
FIGS. 6A-C repeat the circuit of FIG. 5 and illustrate signal flow for various modes of the gate line.

Information flow for this overdrive/underdrive load mode of the gate line 502 is shown by the dashed lines at FIG. 6A, in which the control signal from the gate line 502 propagates via circuit lines 'a' and 'f' to close switch SW1 (SW2 and SW3 remain open), thereby allowing the overdrive/underdrive voltage level present on the source line 501 to directly refresh the capacitor C 508 and drive the LC element 509 via circuit lines 'h' and 'j'.

Next the gate line Gn 502 is driven to the off mode (e.g. 0V) which is input to the voltage based selector 506 via circuit line 'a', and the voltage based selector 506 implements this mode change by outputting control signals via circuit lines 'd', 'e' and T to keep switches SW1, SW2 and SW3 open.

The source line Sn 501 is now driven with second pixel information which is the final load voltage, and the gate line Gn 502 is driven from the overdrive load mode to the final load mode (e.g. 2.5V) which is input to the voltage based selector 506 via circuit line 'a'. The voltage based selector 506 implements this mode change by outputting control signals via circuit lines 'd', 'e' and 'f' to keep switches SW1 and SW3 open and switch SW2 closed; this allows the final load voltage, which lies on the source line Sn 501, to drive via circuit lines 'b' and 'k' to the MIP 507. SW3 and SW1 are still open and so the LC element 509 is still changing its state to the values which were stored on the pixel storage capacitor C 508.

Figure 6B:
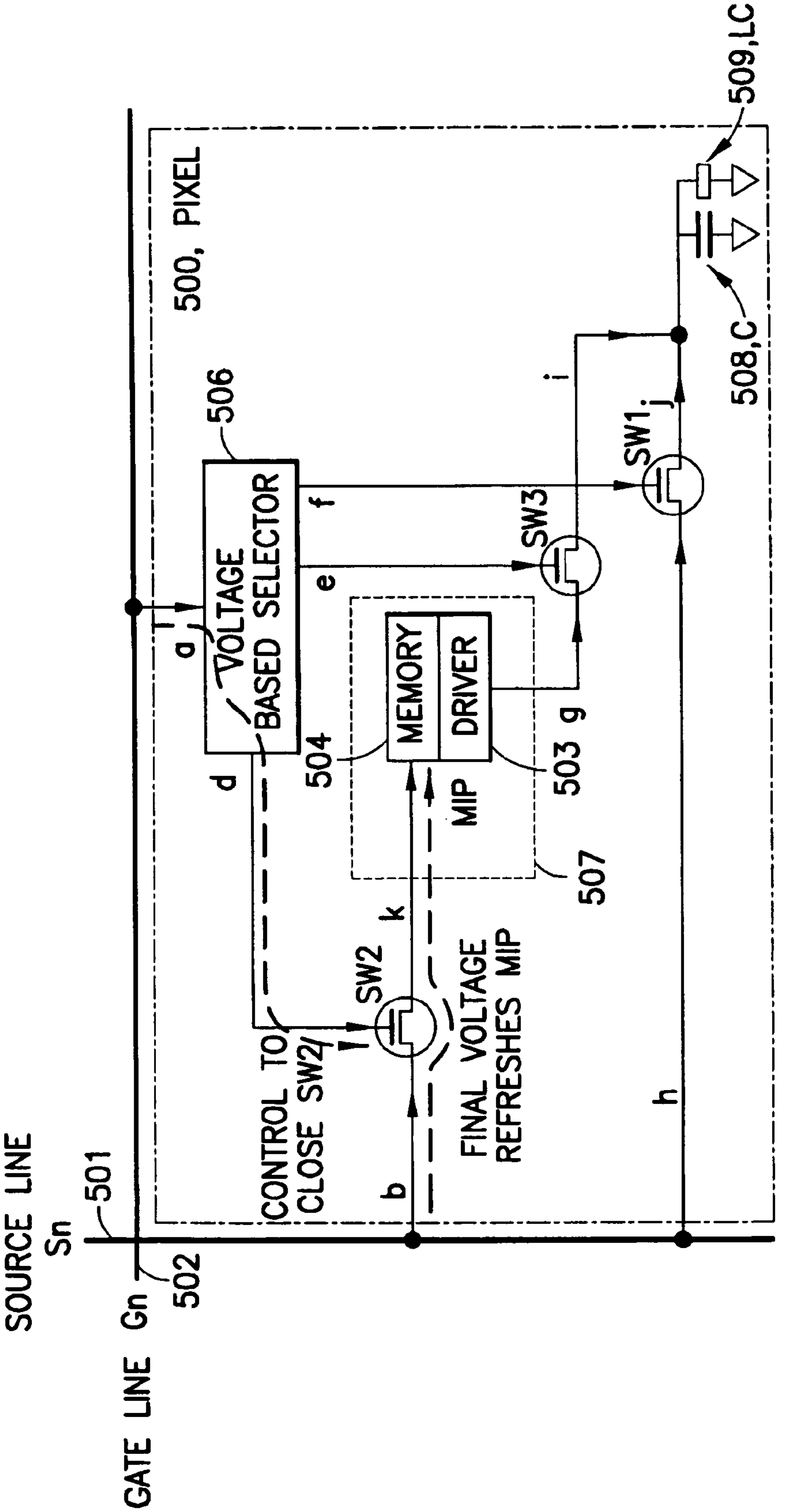

Information flow for this final load mode of the gate line 502 is shown by the dashed lines at FIG. 6B, in which the control signal from the gate line 502 propagates via circuit lines 'a' and 'd' to close switch SW2 (SW1 and SW3 remain open), thereby allowing the final load voltage level present on the source line 501 to refresh the memory element 504 in the MIP 507 via circuit lines 'b' and 'k'. As noted above, during this time the LC element 509 can still refresh from the capacitor C 508 if necessary.

Now the gate line Gn 502 is driven to the off mode (e.g. 0V) which is input to the voltage based selector 506 on circuit line 'a'. The voltage based selector 506 implements this mode change by outputting control signals via circuit lines 'd', 'e' and to keep switches SW1, SW2 and SW3 open.

The gate line Gn 502 is then driven to the final load driving mode (e.g. −2.5V), which is input to the voltage based selector 506 on circuit line 'a'. The voltage based selector 506 implements this mode change by outputting control signals via lines 'd', 'e' and to keep switches SW1 and SW2 open and switch SW3 closed, so that the final load voltage which is on the MIP 507 can be driven via circuit lines 'g' and 'j' to the pixel storage capacitor C 508. At this time the LC element 509 begins to change its state to the final load voltage level, if it is needed.

Figure 6C:
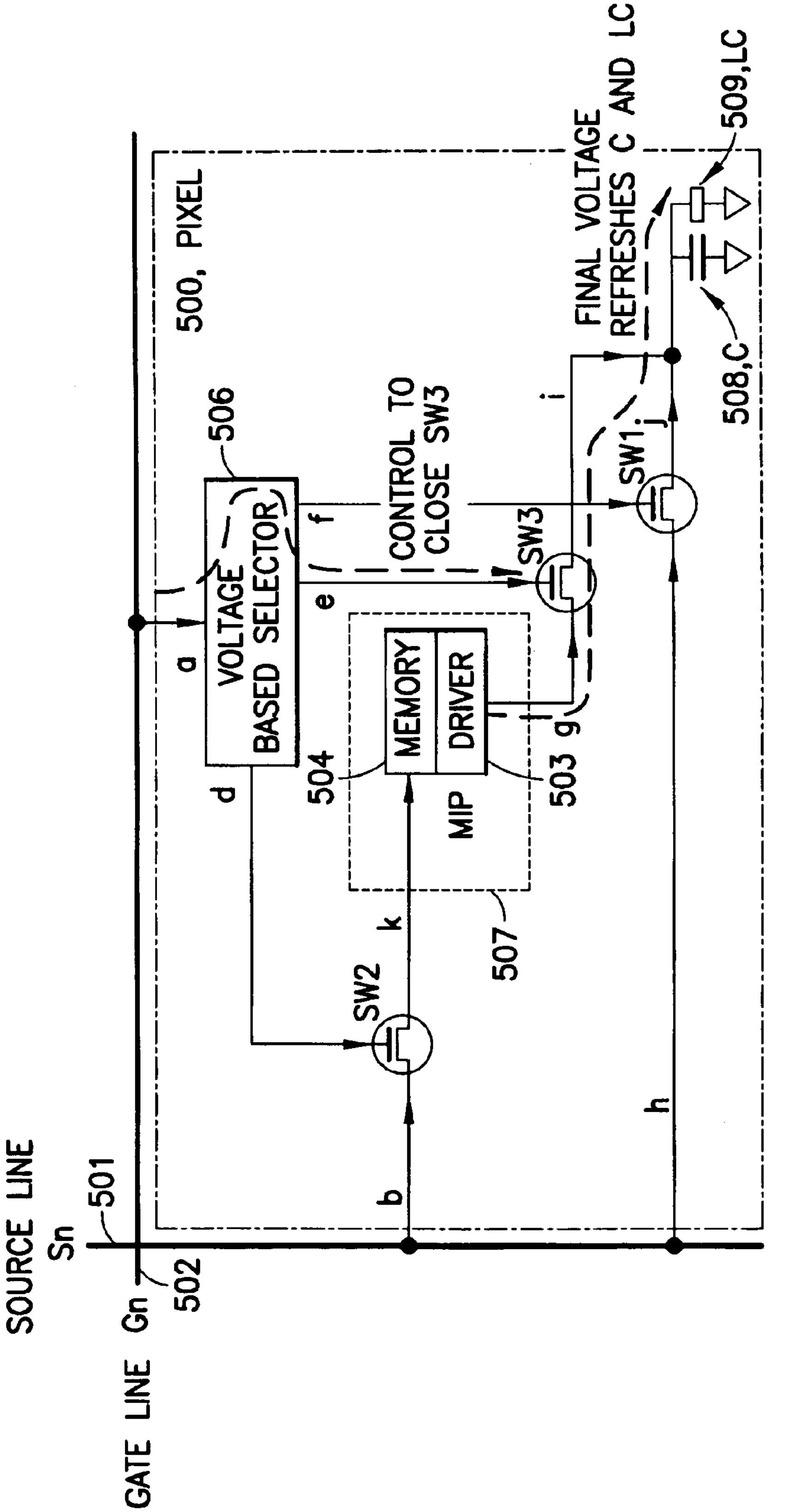

Information flow for this final load driving mode of the gate line 502 is shown by the dashed lines at FIG. 6C, in which the control signal from the gate line 502 propagates via circuit lines 'a' and 'e' to close switch SW3 (SW1 and SW2 remain open), thereby allowing the final load voltage level present on the memory element 504 of the MIP 507 to refresh the capacitor C 508 and the LC element 509 via circuit lines 'g' and 'i'.

Finally the gate line Gn 502 is driven to the off mode (e.g. 0V), input to the voltage based selector 506 on circuit line 'a' and implemented by outputting control signals via circuit lines 'd', 'e' and 'f' to keep switches SW1, SW2 and SW3 open.

Figure 7A:
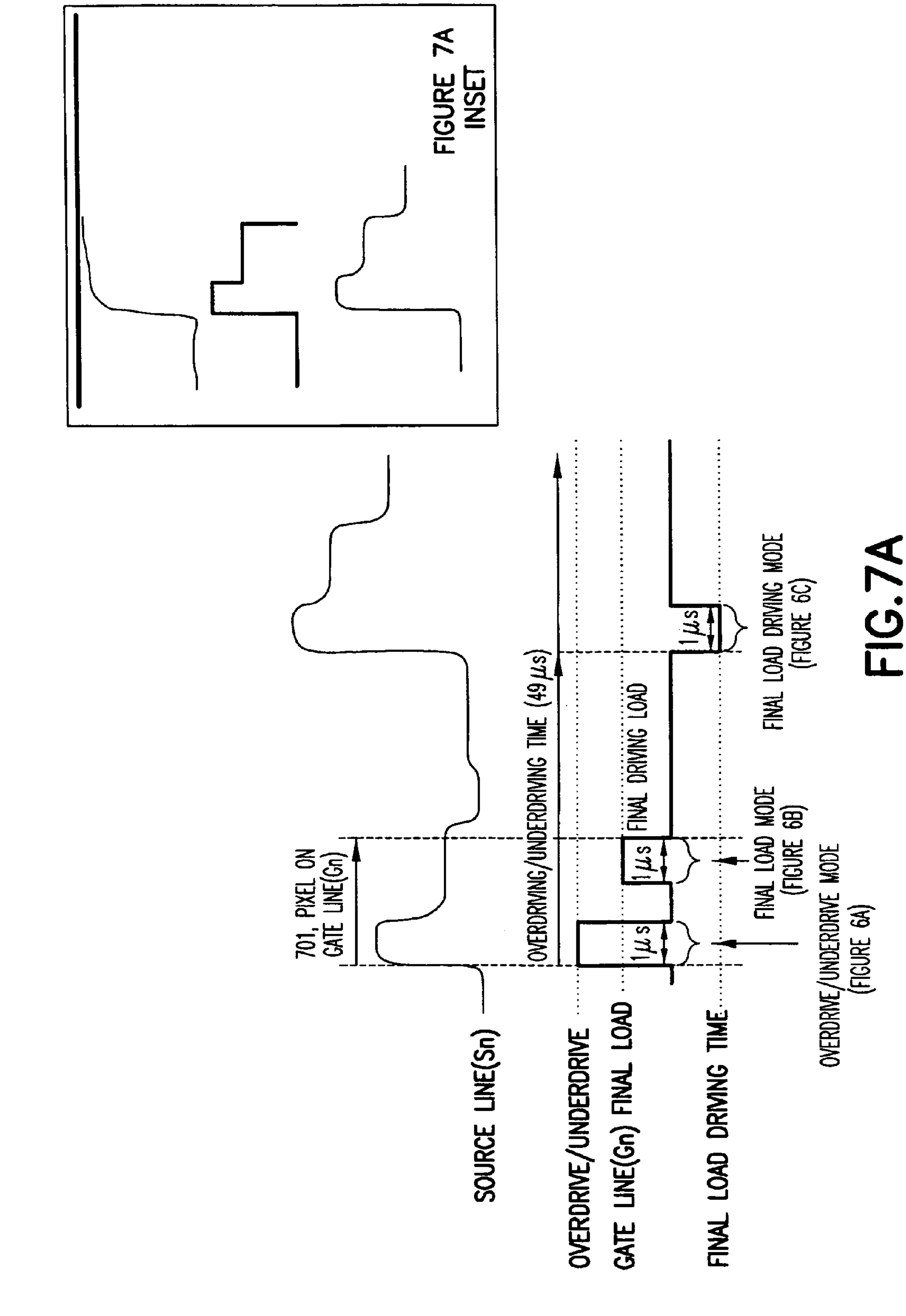
FIG. 7A is a timing diagram for the various gate modes and voltages of the LCD pixel circuit of FIGS. 5 and 6A-C.

FIG. 7A is a timing diagram for the above indirect driving method for the single pixel circuit of FIG. 5 according to the modes shown at FIGS. 6A-C. Times and voltages are exemplary and not limiting. Adjacent to the source line label is an indication of luminance by the LC element itself. Adjacent to the gate line label is voltage on the gate line for the off (0 V), overdrive (5V), final load (2.5V) and final load driving (−2.5V) modes.

Alternatively, the gate line modes may be defined by a voltage transitions on the gate line which proceed in one direction (increasing or decreasing voltage) when following the pixel timing. For example, the overdriving load mode (for loading the source line to the LC element) may be +4.1V to +6.0V; the following off mode may be +3.1V to +4.0V; the final load mode (for loading the source line to the MIP element) may be +2.4V to +3.0V; the next following off mode may be −0.49 to +2.4V; and the final driving load mode (for loading the information in the MIP element to the LC element) may be −3.0 to −0.5V.

Per FIG. 6A, while the gate line is in the overdrive mode the capacitor 508 and LC element 509 is refreshed with the overdrive voltage directly from the source line 101. After 1 μs the gate line is off and the LC element 509 continues to equalize the voltage difference over what was stored on the capacitor 508, and the visual luminance of the LC element 509 is also changing until the voltage difference is equalized. The inset at FIG. 7A shows this as a continuous rise in the pixel luminance or 'position' in view of the varying voltage on the source line; the luminance of the pixel itself will not normally drop in a correctly designed overdrive (or rise in a correctly designed underdrive). When the overdrive/underdrive is complete the drive voltage becomes the target pixel voltage; the pixel response time gets slower but still trends toward the desired value. After a 1 μs off mode for the gate line the gate line 502 is then in the final load mode per FIG. 6B, also for 1 μs, during which the capacitor C 508 and the LC element 509 continue to equalize and the source line 101 refreshes the final voltage to the memory element 504 of the MIP 507. Keeping in mind that the pixel response time limited by the physical characteristics of the LC element 509 itself is assumed at 50 μs, then this off mode for the gate line 502 can extent for 46 μs, which when added to the earlier three modes of 1 μs each yields a total overdriving time of 49 μs as FIG. 7A illustrates.

The gate line 502 is driven to the final load driving mode for the final 1 μs of the pixel cycle in which the LC element 509 and capacitor C 508 are refreshed from the memory element 504 of the MIP 507 as in FIG. 6C. This completes the entire gate selection time period of 50 μs. Adjacent to the source line at FIG. 7A illustrates the luminance of the LC element 509 which follows a stepped profile similar to that during the overdrive and final load mode of the gate line but for a higher luminance. The gate line mode then reverts to off and the pixel settles to the intended luminance.

Importantly, note that at FIG. 7A the voltage on the source line is relevant for this pixel only from the start of the overdrive mode to the end of the final load mode on the gate line, the interval annotated "701, pixel on gate line' in the drawing. Using the timing values above this interval totals 3 μs during which the source line is reserved for this one pixel. During the following two off modes and the final load driving mode of that same gate line for the same pixel, the LC element is refreshed from the memory element of the MIP or not at all. This characteristic of the pixel circuit operation is relevant for the timing diagram of FIG. 7B.

Figure 7B:
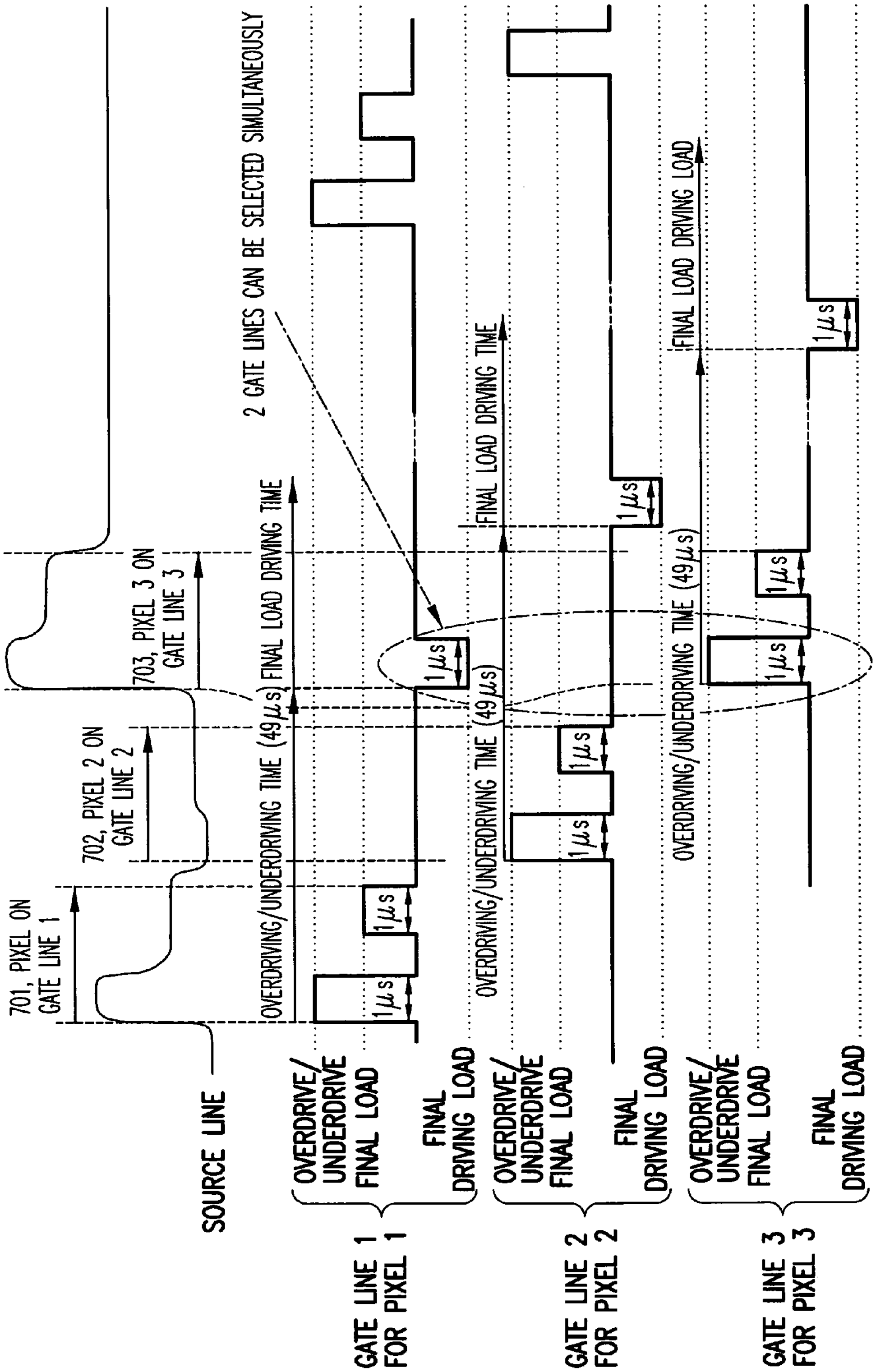
FIG. 7B adds to the timing diagram of FIG. 7B gate lines for two more pixels driven by the same source line.

FIG. 7B is an exemplary timing diagram illustrating how multiple pixels can be controlled within the same 50 μs gate selection time period. FIG. 7B has three gate lines, one for each of three pixels which are driven by the same source line, so consider that when refreshing the whole LCD panel these three pixels are refreshed in turn. Luminance adjacent to the source line is relevant for only pixel 1. Note the source line and gate line for pixel 1 are identical to FIG. 7A; the only addition at FIG. 7B is the addition of two additional gate lines driving two other pixels.

Recalling from FIG. 7A that the source line is only driving pixel 1 for the interval 701 which is identically shown at FIG. 7B, then the same source line is also driving pixels 2 and 3 in FIG. 7B for the respective intervals 702 and 703. At the shaded oval is indicated gate lines 1 and 3 are selected simultaneously since at the same 1 μs tic they are in the final load driving mode and the overdriving mode respectively. So long as the source line is reserved for one gate line between the time that gate line begins the overdrive mode and ends the final load mode, any other gate line can be active.

Assume as with FIG. 7A that it takes 49 μs to "overdrive/underdrive" and 1 μs to achieve the "final load" as defined above. The pixel storage capacitor C can be loaded within 1 μs, meaning that the overdrive/underdrive and the final load modes need 2 μs (1 μs each) for refreshing from the source line Sn. The 1 μs off mode between the overdrive and final load modes of the gate line may be eliminated as can the gaps between the different pixel intervals 701-703 of FIG. 7B. This means that it is possible to start to load other pixel values on the next gate line after 2 μs. As above, the final load driving pulse can also be 1 μs. Utilizing the standard display panel refresh rate of 60 Hz (16.6 ms) means that the maximum number of gate lines in one LCD display is now 8300 (16.6 ms/2 μs). This is a 25-fold improvement over the 332 lines in the example given in the background section above, while using the same gate selection time and the same refresh rate.

Figure 8:
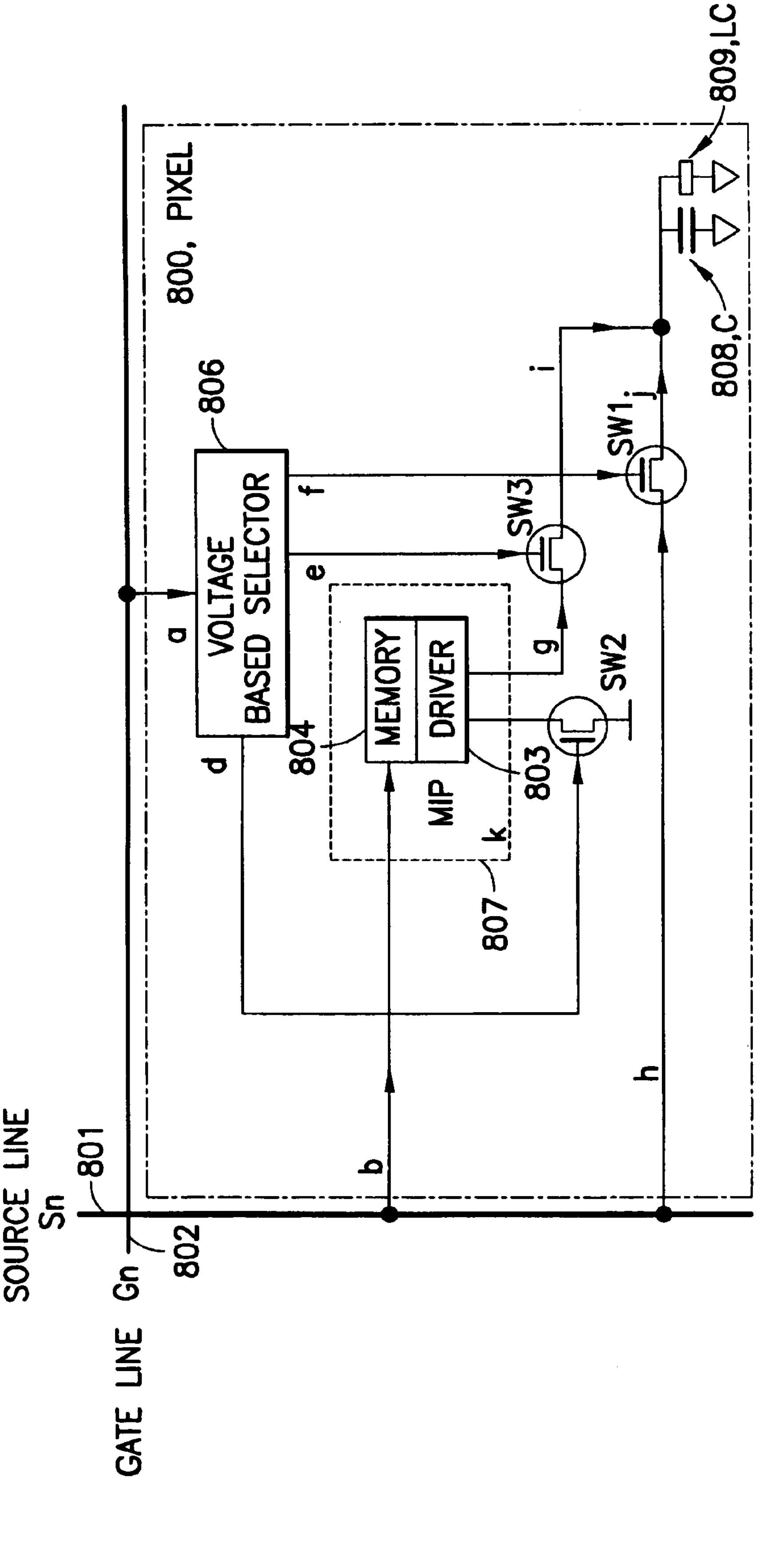
FIG. 8 is similar to FIG. 5 but illustrating an alternative pixel circuit layout according to an exemplary embodiment of the invention.

FIG. 8 illustrates an exemplary alternate circuit layout which operates similar to that of FIG. 5. FIG. 8 illustrates that the pixel 800 includes a source line 801, a gate line 802, a voltage based selector 806, a MIP 807 with memory element 804 and driver 803, a pixel capacitor 808, a LC element 809, and three switches SW1, SW2, SW3. Each of these are arranged as in FIG. 5 with the exception of SW2. Switch control for the various modes is as detailed above, but there is an unswitched connection on circuit line 'b' between the source line 801 and the memory element 804 of the MIP 807 and instead SW2 is on the grounding connection for the driver 803. During the final load mode SW2 is closed which enables the source line 801 to refresh the memory element 804; in all other modes SW2 is open which deprives the driver 803 of a ground and effectively isolates the memory element 804 from the source line 801 despite the unswitched circuit line 'b'.

The simplified diagram of FIG. 8 appears to allow the driver 803 to obtain a ground through the capacitor 808 and LC element 809 when SW3 is closed in the final load driving mode. This is an artifact of the simplification inherent in the FIG. 8 illustration; the availability of the capacitor's ground to the driver 803 depends on circuit details within the MIP block 807 itself and different implementations of the MIP 507 may allow or preclude that grounding possibility for the driver 803. FIG. 8 stands for the general proposition that there are a variety of implementations for the inventive pixel cell other than the specific three switches shown at FIG. 5. Specifically, transistor locations might be moved by using different type (PMOS versus NMOS) transistors; a 'high-side' switch can be moved to a low-side' switch when the complete circuit detail is taken into account; and there may be changes in potentials/polarities of various signals or routings when moving switches. Similar holds true for the specific circuit-specific location of the voltage based selector 506, 806; it's illustrated location is for most clearly describing operation of the pixel cell circuit and is not in itself limiting to the inventive concepts herein.

Figure 9A:
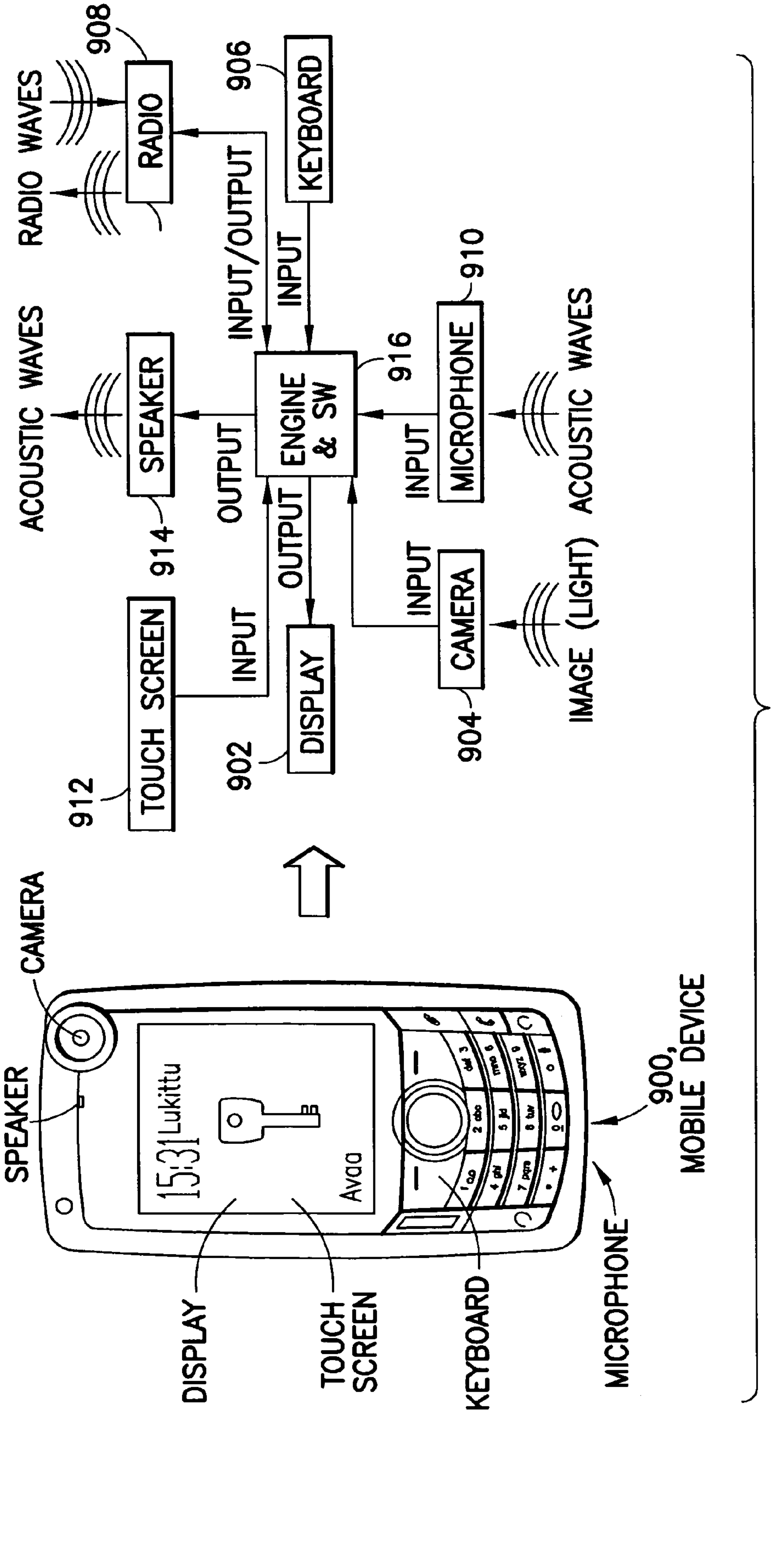
FIG. 9A is a mobile terminal as host device showing schematically various interfaces which might provide data inputs to the various source lines of an LCD panel.

Now are described from FIG. 9A through 11C where and how the data on the source line gets there. FIG. 9A is a mobile terminal 900 as host device showing schematically various interfaces which might provide data inputs to the various source lines of an LCD panel. A display panel with pixel circuitry according to these teachings may be deployed in other host devices as noted above; a mobile terminal is selected for FIG. 8A since that has a wide variety of such interfaces for illustration purposes.

Specifically, a mobile terminal/device 900 includes the graphical display user interface 902 itself for converting electrical information to a visual (readable) format. Input interfaces include one or more of the following: a camera 904 for converting an image based on different levels of light from an object to an electrical format; a keypad or keyboard 906 for converting information from pressed keys to an electrical format; a radio 908 for converting electrical information from/to radio waves; a microphone 910 for converting audio from acoustic waves to an electrical format; and a touch screen 912 for converting physical touches to an electrical format. The touch screen 912 which may be one with the graphical display 902 having the subject source lines or there may be a touch screen 912 separate from the display 902 having the pixel circuitry described herein. There may also be a speaker 914 for converting audio from an electrical format to acoustic waves, but the speaker does not generally provide input to the display. The mobile terminal/device 900 also includes an engine 916 (processor) as well as software (SW) which controls the above conversions.

Figure 9B:
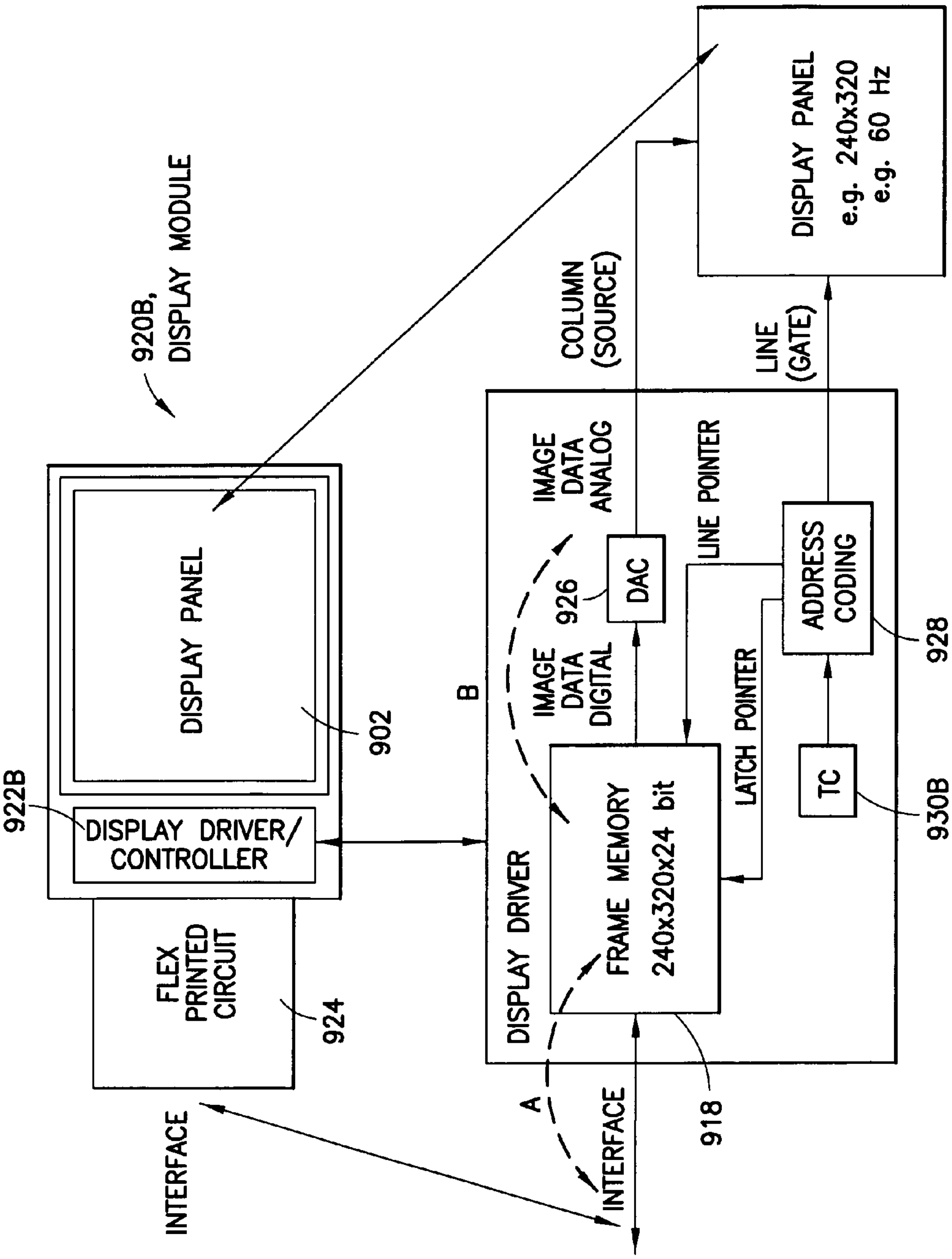
FIGS. 9B-C are schematic illustrations of data from an interface of FIG. 9A to the display panel, respectively with and without a frame memory.

FIG. 9B is a schematic diagram of the mobile terminal 900 with data input from one of the interfaces passing through a frame memory 918 before being displayed at the display panel 902. Mobile device manufacturers sometimes use a display, module 920B to more simply interconnect the other interfaces of the host device 900. The display panel 920B includes a display driver and controller 922B, which take on some if not all of the relevant functions for the engine/SW 916 noted for FIG. 9A. Connections from the various interfaces are mated typically at a flexible printed circuit 924. Inputs from a selected interface are stored in a frame memory 918 of the display module 920B as shown by the information flow of dashed line A. The stored digital image data from the frame memory is converted to analog at a digital to analog converter DAC 926 and output to the various source lines of the display panel 902 at the information flow of dashed line B. As the image data is read out from the frame memory there is an address coder 928 which controls signals on the gate lines of the display panel 902. A timing controller 930B assures the source and gate lines are properly selected. The frame memory allows the flow of line A to be time independent of the flow of line B; updating the display panel is asynchronous with the incoming data from the interface.

Figure 9C:
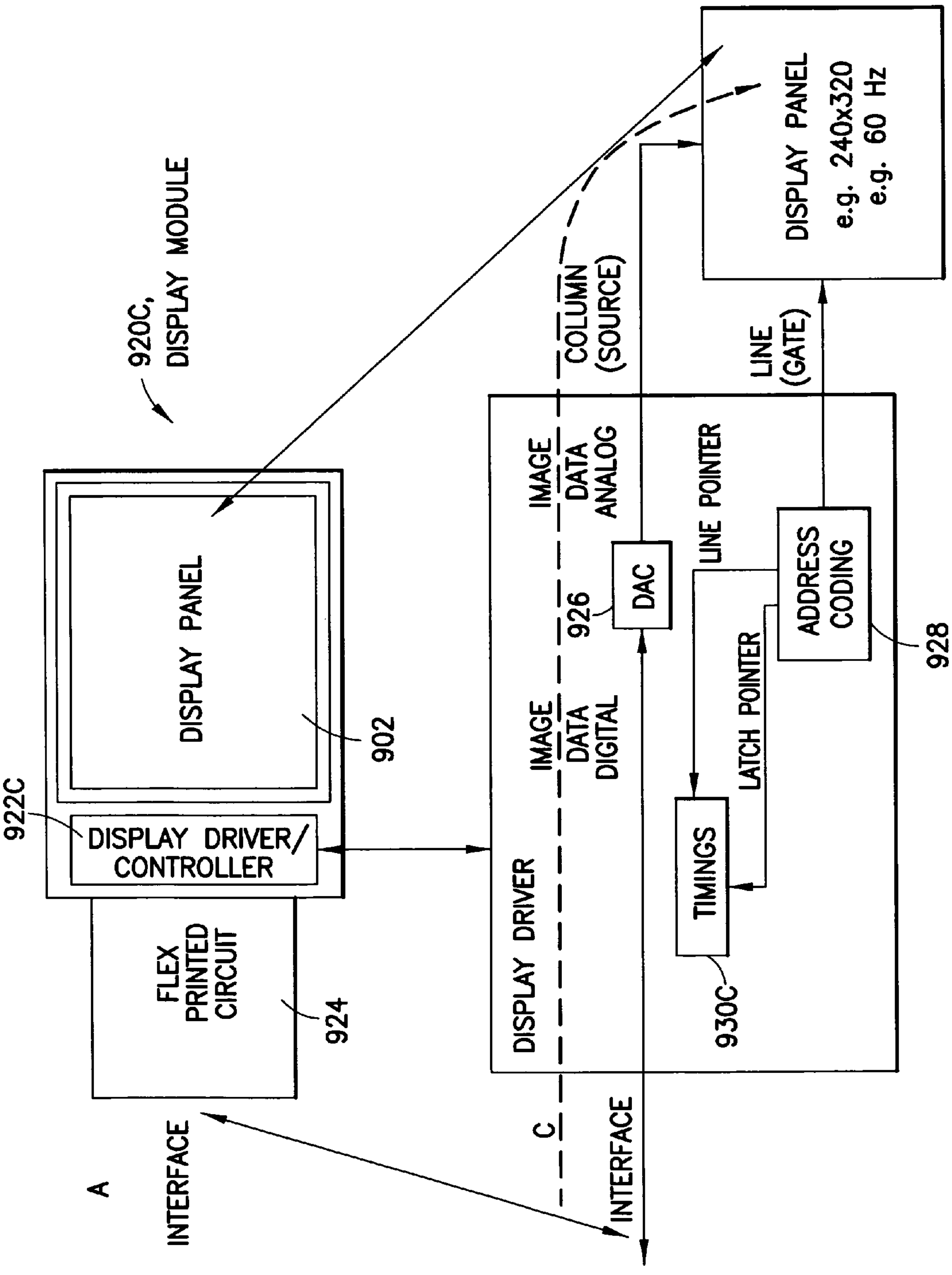

FIG. 9C is similar to FIG. 9B but there is no frame memory. The display module 920C still includes a driver and controller 922C, a DAC 926 and an address coder 928, but instead of a timing controller 930B there is a timing signal 930C taken from the loading of data from the interface to the display panel 902, which as shown by dashed line C is without any intervening storage in memory. In the FIG. 9C case the lack of frame memory means that updating the display panel 902 is synchronized to the data incoming from the interface.

Figure 10A:
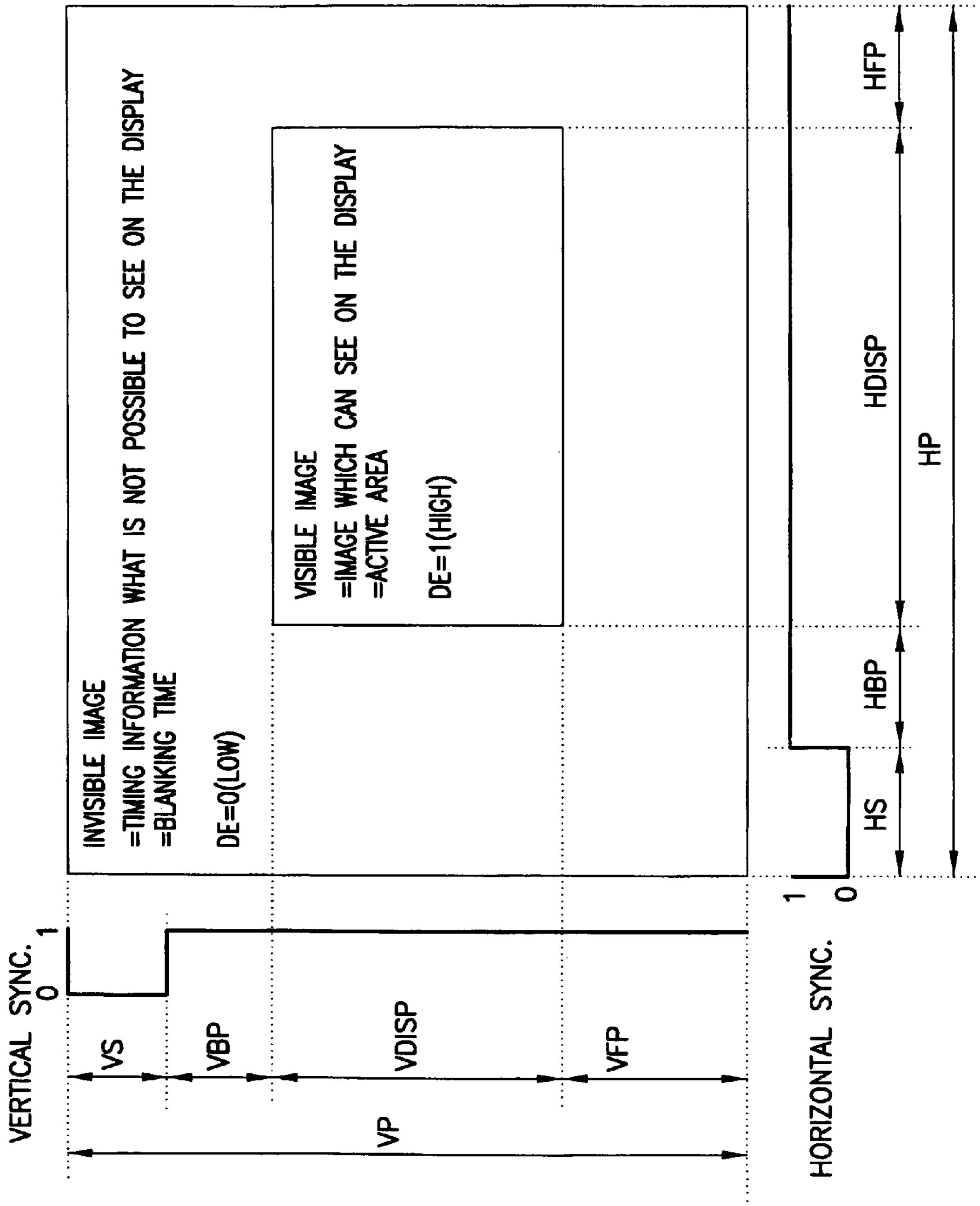
FIG. 10A is a schematic diagram of the display panel of FIGS. 9B-C showing timing for source and gate lines.

FIG. 10A is a schematic diagram of the display panel of FIGS. 9B-C showing timing for source and gate lines. Display panel timings are based on two main timing parameters. Vertical timings (VP) indicate the time needed to update (refresh) the whole display panel once. This vertical update timing is also called the refresh rate, 60 Hz or 16.6 ms in the above examples. Horizontal timings (HP) indicate the time what is needed to update one of the horizontal lines spanning the display panel. The HP timing depends on the VP timing. For example, 60 Hz refresh rate for 480 lines means that one horizontal time is 34.58 μs (16.6 ms/480 lines). The terms horizontal and vertical for the lines are for convention and do not necessarily reflect the panel orientation, which can be easily rotated from the viewer's perspective.

Figure 10B:
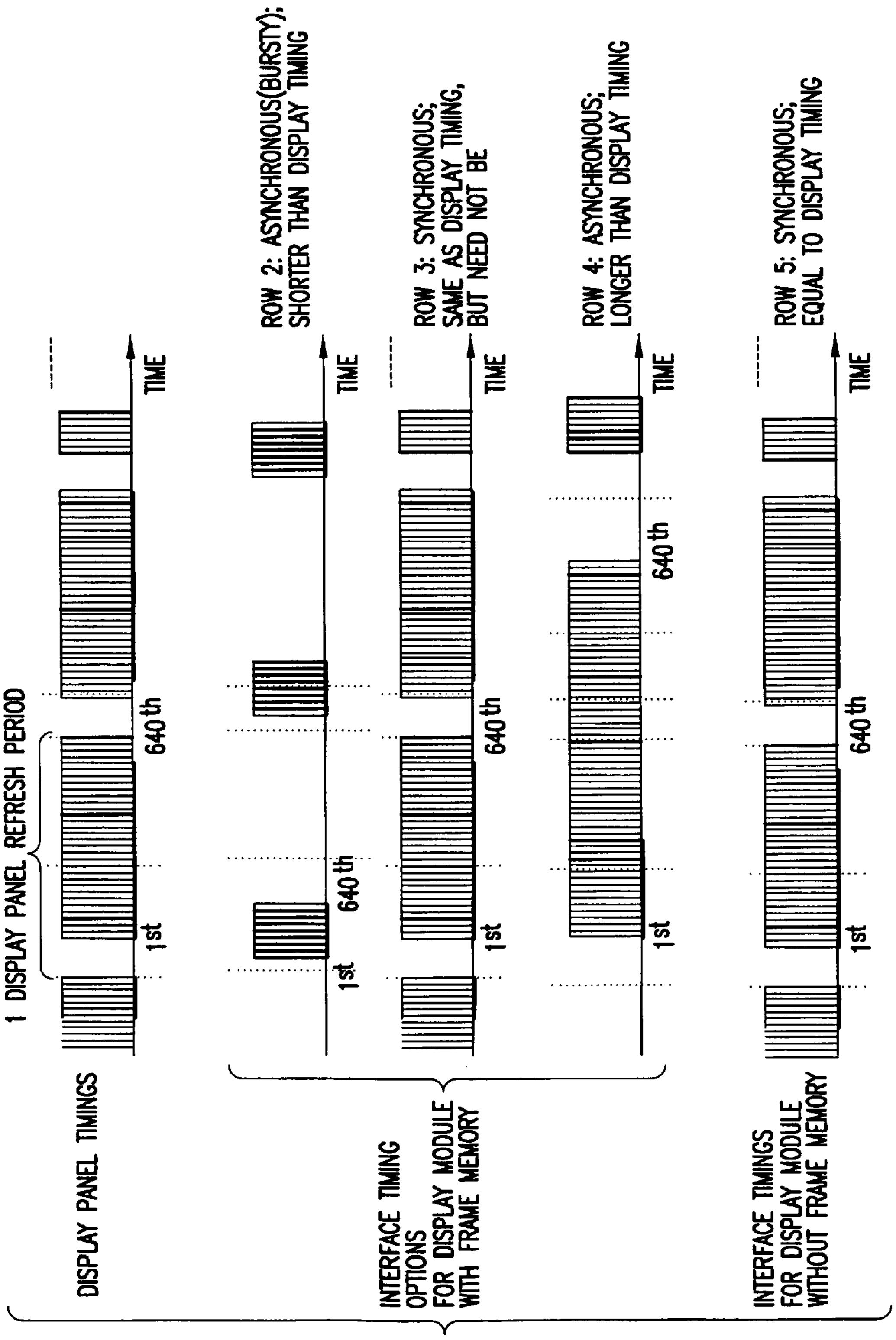
FIG. 10B illustrates timings for inputting data for the source lines of FIG. 10A both with and without a frame memory as in FIGS. 9B-C.

FIG. 10B illustrates timings for inputting data for the source lines of FIG. 10A both with and without a frame memory as in FIGS. 9B-C, assuming there are 640 source lines (vertical) and 480 gate lines (horizontal). The upper row indicates timing for updating the 640 source lines of the display panel itself. All other rows indicate interface timings. Three options are shown for frame memory input data timing such as for the display module of FIG. 9B. The second row illustrates the frame memory is loaded over a shorter time than needed to update the display panel, as in bursty data. The third row has the frame memory loaded at equal timing as that used to refresh the display panel. The fourth row has the frame memory loaded over a longer period of time than the display panel is updated. And the fifth row is identical to the third row but is the necessary timing for the display module of FIG. 9C, since there is no frame memory to enable asynchronous interface and display timing.

Figures 11A, 11B, 11C:
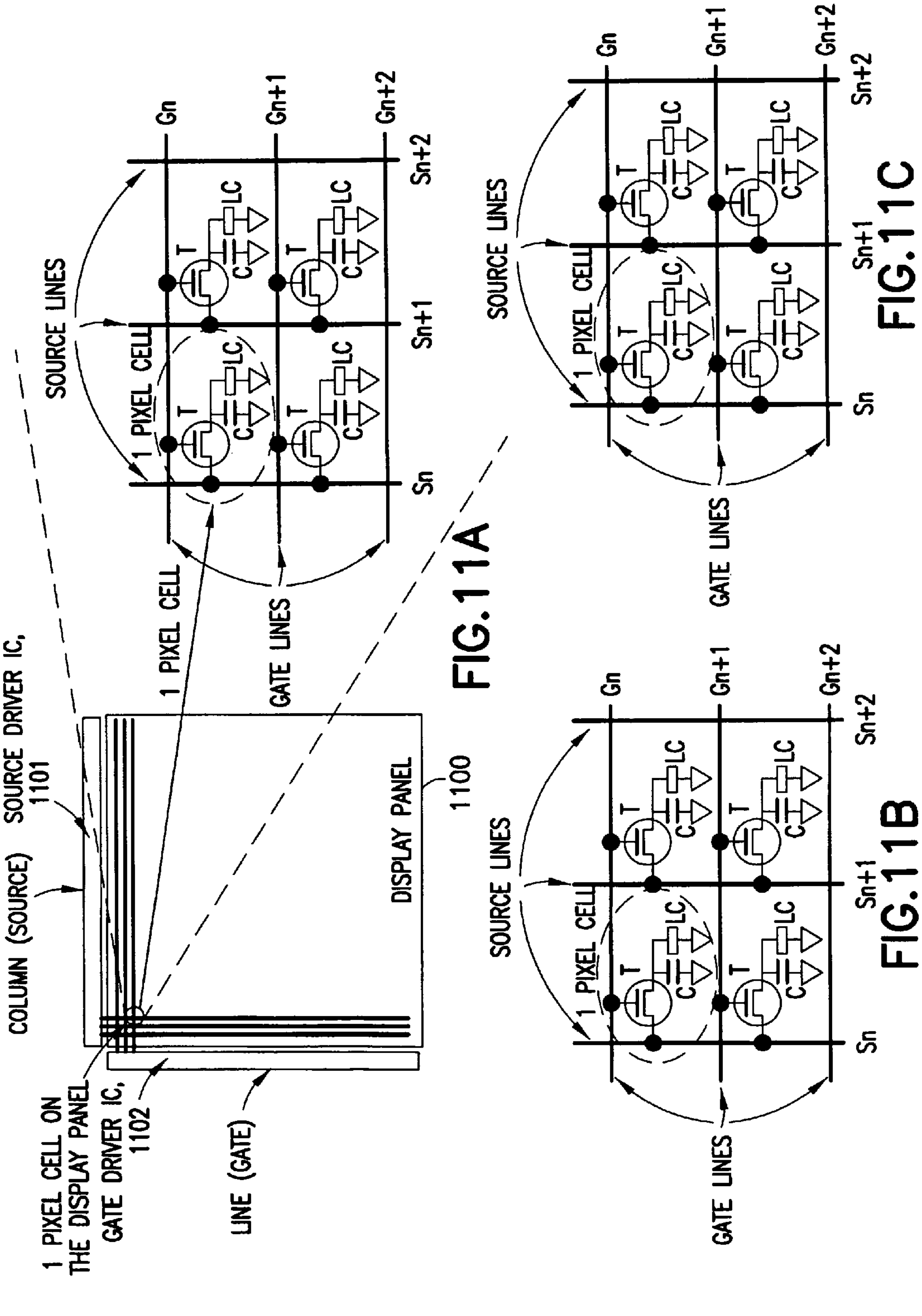
FIGS. 11A-C are schematic diagrams illustrating source and gate line selection for individual pixel cell control.

FIGS. 11A-C are schematic diagrams illustrating source and gate line selection for controlling individual pixel cells one by one, with gate lines running horizontal and source lines running vertical. At FIG. 11A is shown a source driver 1101 and a gate driver 1102, which may be implemented as integrated circuits ICs affixed to the display panel 1100 itself such as in a display module previously described. The expanded view shows three source lines Sn, Sn+1 and Sn+2, and similarly three gate lines G, G+1 and G+2. The intersection of one source line and one gate line defines one and only one pixel cell.

Recall FIG. 9B. When image data is input from the interface via the engine to the frame memory on the display driver, the timing controller sends information to the address coding block which generates control signals as to which location is being read from the frame memory. FIG. 9B shows such control signals as the latch pointer and the line pointer. Thus the image data is a digital grey scale value. This digital image data is input to the DAC which changes its value to analog image data for the column/source lines Sn, Sn+1, Sn+2, etc. This analog image data is input on the display panel at a location (pixel cell), the location of which is controlled by the address coding block via control signal selection of a source line and a gate line. The gate line (Line) control signal is a digital value ('0' or '1') which is used for selecting a line of the pixels on the display panel where is stored the analog information of the image data from the source line.

At the pixel cell, which is visible to the user, operation is as follows. The source driver 1101 is outputting analog image data value on the source lines (Sn, Sn+1, Sn+2, etc.). The gate driver 1102 is outputting a gate line selection where all pixel cells are updated. There is only updated one line of the pixel at the same time. The pixels are not updated on the other lines. This update typically starts at one of the edge of the display panel and thereafter every next line (e.g. from Gn=>Gn+1=>Gn+2, etc.) is updated until the opposite side of the display panel 100 is reached, after which the updating begins again.

So for two pixel rows illustrated separately at FIGS. 11B-C, the analog image data is output on the source lines (Sn, Sn+1, Sn+2, etc), there is selected a gate line Gn (selection is via a switch, illustrated as a transistor T) which is closed to select gate line Gn while all other gate lines have open switches and are not selected. The analog image data (current) can flow through the closed switch to load the pixel cell (either the MIP or capacitor depending on the gate line mode). In conventional LCDs this one gate line transistor remained closed and the loading for that pixel continued until the gate line transistor was opened and the next gate line was selected (T closed). In conventional practice (e.g., with only a C and LC in the pixel as illustrated at FIGS. 11B-C) this loading also controls the liquid crystal cell (LC) of the pixel cell and the loaded memory (Capacitor C) holds the analog value (visible grey level of the pixel cell) until the same gate line is selected the next time for a new loading. So in conventional approaches the data on the source lines Sn and Sn+1 might be present simultaneously but since only one gate line Gn could be selected at a given time loading the next row Gn+1 could only proceed once the original gate line Gn was de-selected. If not then the source line (analog grey scale) value intended for the pixel at Sn,Gn+1 would in fact be loaded also to the pixel at Sn,Gn. As detailed above and particularly with respect to FIG. 7B, exemplary embodiments of these teachings allow sequential gate lines Gn and Gn+1 to be active/selected simultaneously, thereby reducing the overall refresh rate needed for a given display panel size.

Figure 12:
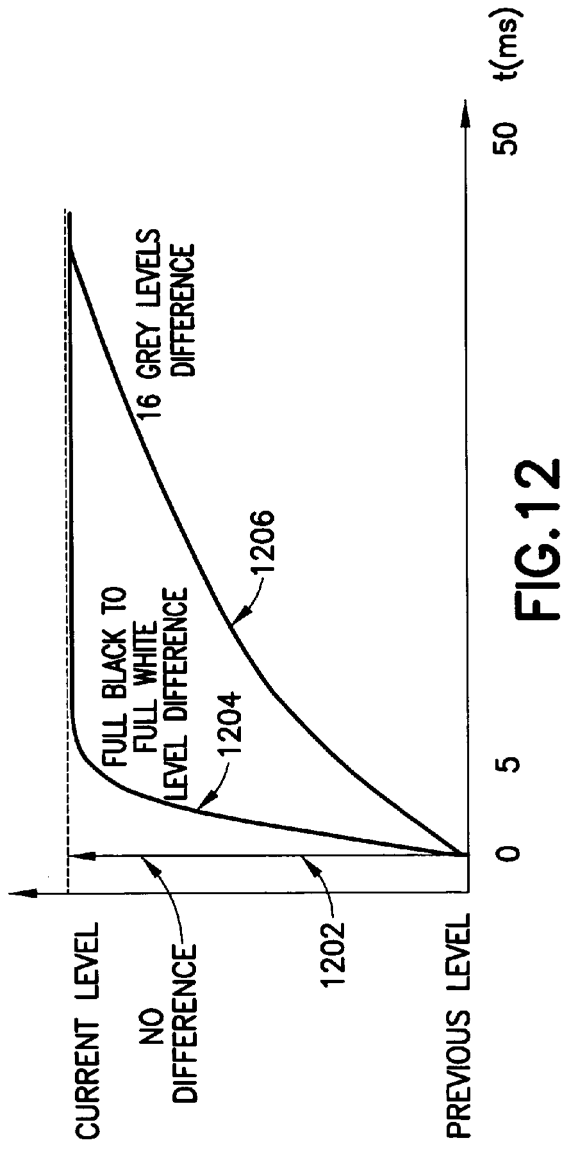
FIG. 12 is a plot showing dependence of pixel response time of the difference between previous and current value/grey scale voltage.

FIG. 12 illustrates pixel response time, noted above. In practice for an LCD the pixel response time depends on a difference between the previous pixel information/grey scale value and the current pixel information/grey scale value to which the pixel is being driven. If the previous pixel information and the current pixel information are the same as in line 1202, the pixel response time is of course 0 ms since there is no voltage change. If the previous pixel information and the current pixel information are the farthest values from one another (e.g. full white to full black), the pixel response time is approximately 5 ms as seen at line 1204. If the previous pixel information and the current pixel information are near each other in value, the pixel response time is around 50 ms, shown by line 1206. Since the pixel value is analog, all pixel response times between about 0 and 50 ms are possible, the individual value depending on the difference between past and current pixel information. Note that 5 ms and 50 ms above are exemplary for illustrating the principle, and are not meant to reflect all LC materials; actual response times may vary greatly for other LC materials and other LCD panel technologies now available or yet to be developed.

Figure 13:
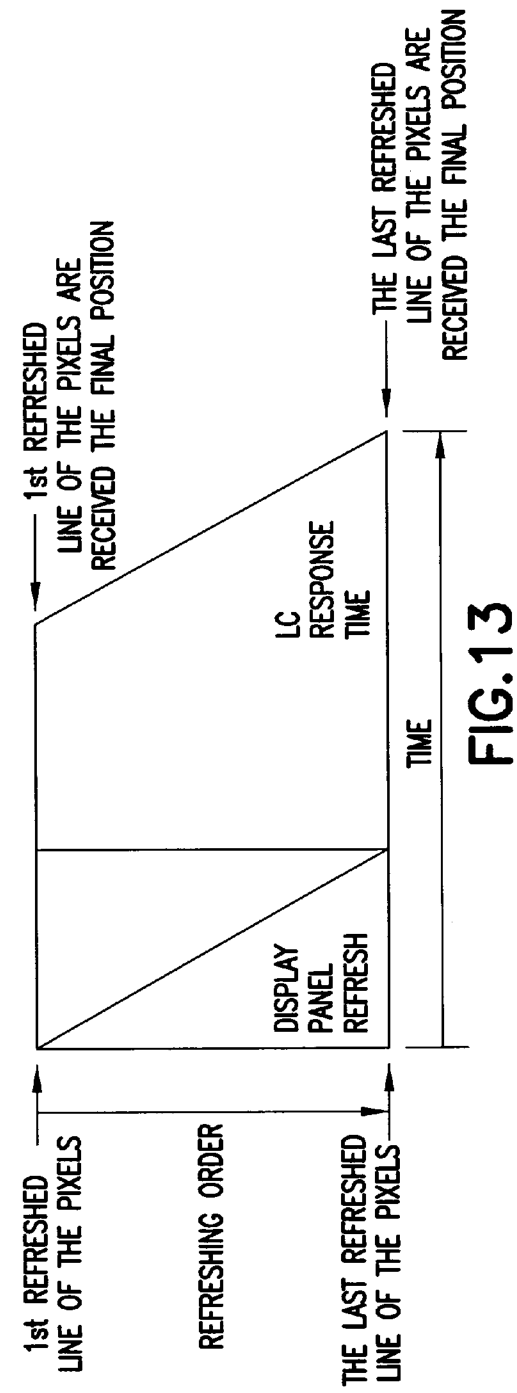
FIG. 13 is a schematic timing diagram showing total refresh time for a full LCD panel using conventional pixel refresh techniques.

FIG. 13 illustrates a timeline for refreshing a conventional LCD panel, assuming the worst case pixel response time from FIG. 12. The lines are refreshed from top to bottom, so update to the first line is completed before the update to the second line, etc. through all the lines of the panel. By refreshing different lines simultaneously as detailed above (see for example FIG. 7B), and without reducing the LC response time which is a characteristic of the LC material itself, it is clear that the total panel refresh time can be drastically reduced as compared to the conventional timing of FIG. 13, and the amount of the reduction depends on how many lines are simultaneously selected. The above examples utilizing the pixel cell circuit of FIG. 5 (or alternatively FIG. 8) detail a 25-fold reduction.

Apart from the pixel cell circuitry itself, embodiments of the invention may be implemented in controlling hardware (e.g., at least one processor, such as the engine of FIG. 9A, the display controller of FIGS. 9B-C, and/or the source and gate ICs of FIG. 11A), software stored on a tangible memory (e.g., the driver on the MIP in FIGS. 5 and 8, the SW of FIG. 9A, and/or the display driver of FIGS. 9B-C), or in some combination of hardware and tangibly stored software. Such tangibly stored software may also be at least in part firmware.

Means for tangibly storing such software/firmware may be of any type suitable to the local technical environment and may be implemented using any suitable data storage technology, such as semiconductor based memory devices, flash memory, magnetic memory devices and systems, optical memory devices and systems, fixed memory and removable memory. Controlling hardware may be the circuitry within the pixel cell itself, and/or processing means which may be of any type suitable to the local technical environment, including but not limited to one or more of the following: general purpose computers; special purpose computers (e.g., application specific integrated circuits ASICs); microprocessors; digital signal processors (DSPs); and/or processors based on a multicore processor architecture. The memories and processors noted above are non-limiting examples.

Figure 14:
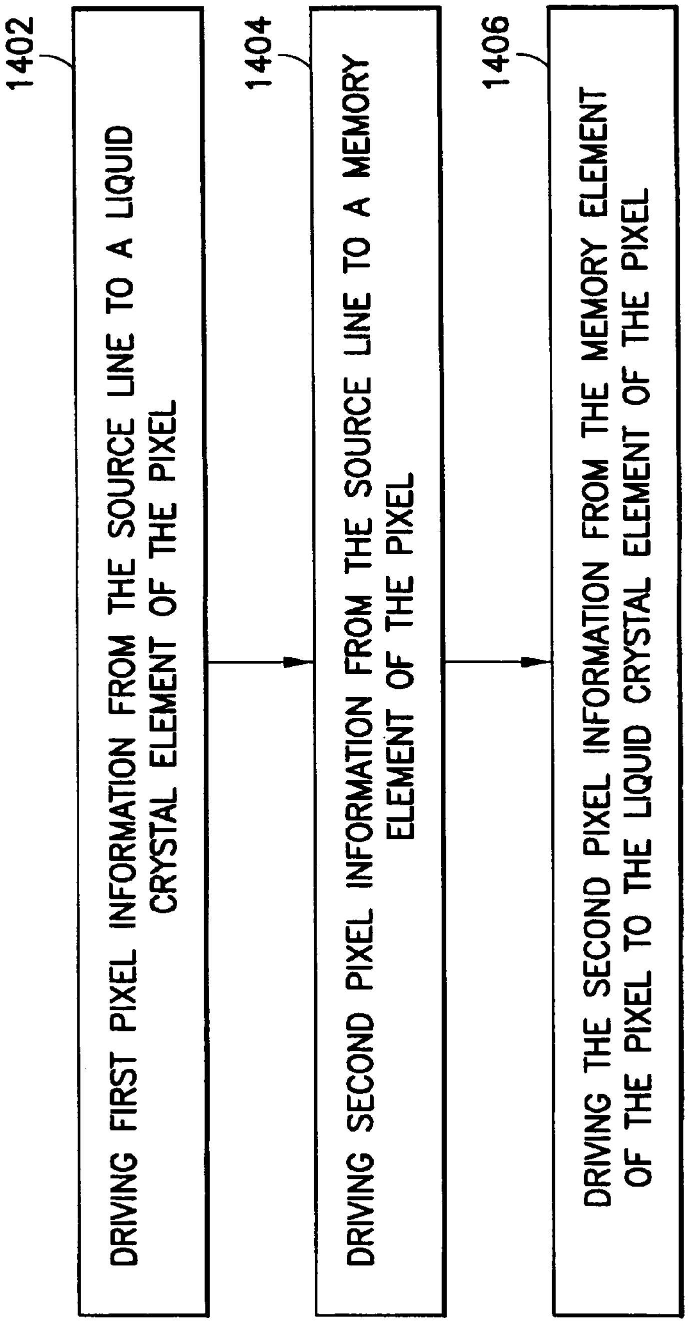
FIG. 14 is a logic flow diagram that illustrates the operation of a method, and a result of execution of computer program instructions embodied on a computer readable memory, in accordance with the exemplary embodiments of this invention.

FIG. 14 is a logic flow diagram that illustrates the operation of a method, and a result of execution of computer program instructions, in accordance with the exemplary embodiments of this invention. Based on the foregoing it should be apparent that the exemplary embodiments of this invention provide a method, apparatus and computer program(s) for, within one gate selection time interval; at block 1402 driving first pixel information from a source line to a liquid crystal element of a pixel; at block 1404 driving second pixel information from the source line to a memory element of the pixel; and at block 1406 driving the second pixel information from the memory element of the pixel to the liquid crystal element of the pixel.

If we consider the pixel of blocks 1402, 1404 and 1406 as a first pixel and the gate selection time interval as a first gate selection time interval, then in an exemplary embodiment, within a second gate selection time interval: third pixel information is driven from the source line to a liquid crystal element of the second pixel; fourth pixel information is driven from the source line to a memory element of the second pixel; and the fourth pixel information is driven from the memory element of the second pixel to the liquid crystal element of the second pixel. As detailed above for two pixels, the second pixel information is driven from the memory element of the first pixel to the liquid crystal element of the first pixel simultaneous with the third pixel information being driven from the source line to the liquid crystal element of the second pixel.

In an exemplary embodiment, circuit-wise the pixel comprises: a first switch selectively interfacing the source line to the liquid crystal element; a second switch selectively interfacing the source line to the memory element; and a third switch selectively interfacing the memory element to the liquid crystal element. In this exemplary embodiment: driving the first pixel information from the source line to the liquid crystal element of the pixel comprises closing the first switch while the second and third switches are open; driving the second pixel information from the source line to the memory element of the pixel comprises closing the second switch while the first and third switches are open; and driving the second pixel information from the memory element of the pixel to the liquid crystal element of the pixel comprises closing the third switch while the first and second switches are open.

Further in the above exemplary embodiment: closing the first switch results from driving a gate line with a first voltage; closing the second switch results from driving the gate line with a second voltage; and closing the third switch results from driving the gate line with a third voltage. This embodiment may be implemented with a voltage based selector in the pixel, the voltage based selector coupled to the gate line and controlling the first, second and third switches based on the first, second and third voltages. In another exemplary embodiment the pixel further comprises a pixel capacitor in series with the liquid crystal element and driven with the first and second pixel information identically to the liquid crystal element.

The various blocks shown in FIG. 14 may be viewed as method steps, and/or as actions that result from operation of computer program code, and/or as a plurality of coupled logic circuit elements constructed to carry out the associated function(s). While various aspects of the exemplary embodiments of this invention may be illustrated and described as block diagrams, flow charts, or using some other pictorial representation, it is understood that these blocks, apparatus, systems, techniques or methods described herein may be implemented in, as nonlimiting examples, hardware, software, firmware, special purpose circuits or logic, general purpose hardware or controller or other computing devices, or some combination thereof.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:

driving first pixel information from a source line to a liquid crystal element of a pixel when the gate line is in a first level within a first gate line selection time interval;

driving second pixel information from the source line to a memory element of the pixel when the gate line is in a second level within the first gate line selection time interval; and driving the second pixel information from the memory element of the pixel to the liquid crystal element of the pixel when the gate line is in a third level within a third gate line selection time interval;

wherein the first level, the second level, and the third level are three different levels;

wherein the first gate line selection time interval and the third gate line selection time interval are different time intervals.

2. The method according to claim 1, in which the pixel is a first pixel and the gate line selection time interval is a first gate line selection time interval, the method further comprising:

within a second gate line selection time interval;

driving third pixel information from the source line to a liquid crystal element of the second pixel;

driving fourth pixel information from the source line to a memory element of the second pixel; and driving the fourth pixel information from the memory element of the second pixel to the liquid crystal element of the second pixel;

wherein driving the second pixel information from the memory element of the first pixel to the liquid crystal element of the first pixel is simultaneous with driving the third pixel information from the source line to the liquid crystal element of the second pixel.

3. The method according to claim 1, in which the pixel comprises:

a first switch selectively interfacing the source line to the liquid crystal element;

a second switch selectively interfacing the source line to the memory element; and a third switch selectively interfacing the memory element to the liquid crystal element;

and in which driving the first pixel information from the source line to the liquid crystal element of the pixel comprises closing the first switch while the second and third switches are open;

driving the second pixel information from the source line to the memory element of the pixel comprises closing the second switch while the first and third switches are open; and driving the second pixel information from the memory element of the pixel to the liquid crystal element of the pixel comprises closing the third switch while the first and second switches are open.

4. The method according to claim 3, in which:

closing the first switch results from driving a gate line with a first voltage;

closing the second switch results from driving the gate line with a second voltage; and closing the third switch results from driving the gate line with a third voltage.

5. The method according to claim 4, in which the pixel further comprises a voltage based selector coupled to the gate line and controlling the first, second and third switches based on the first, second and third voltages.

6. The method according to claim 5, in which the pixel further comprises a pixel capacitor in series with the liquid crystal element and driven with the first and second pixel information identically to the liquid crystal element.

7. The method according to claim 4, in which the first and second pixel information on the source line is analog grey scale pixel information.

8. The method according to claim 1, in which the pixel is one of a plurality of pixels forming a liquid crystal display disposed within a host device, and the first and second pixel information is input from at least one of a radio, a touch screen, a keyboard, a camera and a microphone of the host device.

9. The method according to claim 1, wherein the first level comprises a first voltage level, wherein the second level comprises a second voltage level, wherein the third level comprises a third voltage level, wherein the pixel comprises a single pixel, wherein image information is inputted into the single pixel with only two control lines, and wherein the one gate line selection time interval comprises one time period.

10. An apparatus, comprising:

at least one processor;

at least one memory storing computer program code;

a first switch;

a second switch;

a third switch;

a voltage based selector;

a memory-in-pixel (MIP) component;

a pixel storage capacitor; and a liquid crystal (LC) element;

wherein the voltage based selector is directly connected to the first switch, the second switch, and the third switch;

wherein the MIP component is between the second switch and the third switch; and wherein the pixel storage capacitor is directly connected to the LC element;

wherein the at least one memory and the computer program code configured, with the at least one processor, at least to:

drive first pixel information from a source line to a liquid crystal element of a pixel when the gate line is in a first level within a first gate line selection time interval;

drive second pixel information from the source line to a memory element of the pixel when the gate line is in a second level within the first gate line selection time interval; and drive the second pixel information from the memory element of the pixel to the liquid crystal element of the pixel when the gate line is in a third level within a third gate line selection time interval;

wherein the pixel comprises two memory elements;

wherein the first level, the second level, and the third level are three different levels; and wherein the first gate line selection time interval and the third gate line selection time interval are different time intervals.

11. The apparatus according to claim 10, in which the pixel is a first pixel and the gate line selection time interval is a first gate line selection time interval, in which the at least one memory and the computer program code configured, with the at least one processor, at least further to:

within a second gate line selection time interval;

drive third pixel information from the source line to a liquid crystal element of the second pixel;

drive fourth pixel information from the source line to a memory element of the second pixel; and drive the fourth pixel information from the memory element of the second pixel to the liquid crystal element of the second pixel;

wherein the second pixel information is driven from the memory element of the first pixel to the liquid crystal element of the first pixel simultaneous with the third pixel information being driven from the source line to the liquid crystal element of the second pixel.

12. The apparatus according to claim 10, in which the pixel comprises:

a first switch selectively interfacing the source line to the liquid crystal element;

a second switch selectively interfacing the source line to the memory element; and a third switch selectively interfacing the memory element to the liquid crystal element;

and in which the first pixel information is driven from the source line to the liquid crystal element of the pixel by closing the first switch while the second and third switches are open;

the second pixel information is driven from the source line to the memory element of the pixel by closing the second switch while the first and third switches are open; and the second pixel information is driven from the memory element of the pixel to the liquid crystal element of the pixel by closing the third switch while the first and second switches are open.

13. The apparatus according to claim 12, in which:

the first switch is closed by driving a gate line with a first voltage;

the second switch is closed by driving the gate line with a second voltage; and the third switch is closed by driving the gate line with a third voltage.

14. The apparatus according to claim 13, in which the pixel further comprises a voltage based selector coupled to the gate line and controlling the first, second and third switches based on the first, second and third voltages.

15. The apparatus according to claim 14, in which the pixel further comprises a pixel capacitor in series with the liquid crystal element and driven with the first and second pixel information identically to the liquid crystal element.

16. The apparatus according to claim 13, in which the first and second pixel information on the source line is analog grey scale pixel information.

17. The apparatus according to claim 10, in which the apparatus comprises a host device;

the pixel is one of a plurality of pixels forming a liquid crystal display disposed within the host device;

and the first and second pixel information is input from at least one of a radio, a touch screen, a keyboard, a camera and a microphone of the host device.

18. A memory storing a program of computer readable instructions comprising:

code for driving first pixel information from a source line to a liquid crystal element of a pixel when the gate line is in a first level within a first gate line selection time interval;

code for driving second pixel information from the source line to a memory element of the pixel when the gate line is in a second level within the first gate line selection time interval; and code for driving the second pixel information from the memory element of the pixel to the liquid crystal element of the pixel when the gate line is in a third level within a third gate line selection time interval;

wherein only the gate line and the source line are configured to drive the pixel;

wherein the first level, the second level, and the third level are three different levels: and wherein the first gate line selection time interval and the third gate line selection time interval are different time intervals.

19. The memory according to claim 18, in which the pixel is a first pixel and the gate line selection time interval is a first gate line selection time interval, the program of computer readable instructions further comprising:

code for driving third pixel information from the source line to a liquid crystal element of the second pixel within a second gate line selection time interval;

code for driving fourth pixel information from the source line to a memory element of the second pixel within the second gate line selection time interval; and code for driving the fourth pixel information from the memory element of the second pixel to the liquid crystal element of the second pixel within the second gate line selection time interval;

wherein the second pixel information is driven from the memory element of the first pixel to the liquid crystal element of the first pixel simultaneous with the third pixel information being driven from the source line to the liquid crystal element of the second pixel.

20. The memory according to claim 18, in which the pixel comprises:

a first switch selectively interfacing the source line to the liquid crystal element;

a second switch selectively interfacing the source line to the memory element; and a third switch selectively interfacing the memory element to the liquid crystal element;

and in which the code for driving the first pixel information from the source line to the liquid crystal element of the pixel closes the first switch while the second and third switches are open;

the code for driving the second pixel information from the source line to the memory element of the pixel closes the second switch while the first and third switches are open; and the code for driving the second pixel information from the memory element of the pixel to the liquid crystal element of the pixel closes the third switch while the first and second switches are open.

21. The memory according to claim 20, in which:

the first switch is closed in response to driving a gate line with a first voltage;

the second switch is closed in response to driving the gate line with a second voltage; and the third switch is closed in response to driving the gate line with a third voltage.

* * * * *